US012032318B2

(12) United States Patent
Amemiya et al.

(10) Patent No.: US 12,032,318 B2
(45) Date of Patent: Jul. 9, 2024

(54) ELECTROPHOTOGRAPHIC IMAGE FORMING SYSTEM WITH CLEANING BLADE

(71) Applicant: KONICA MINOLTA, INC., Tokyo (JP)

(72) Inventors: Taiki Amemiya, Hachioji (JP); Kazutoshi Kobayashi, Hachioji (JP); Yukio Hosoya, Tama (JP); Seijiro Takahashi, Kokubunji (JP); Tomoko Sakimura, Hino (JP); Kazukuni Nishimura, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/064,490

(22) Filed: Dec. 12, 2022

(65) Prior Publication Data

US 2023/0185227 A1 Jun. 15, 2023

(30) Foreign Application Priority Data

Dec. 14, 2021 (JP) ................................. 2021-202148

(51) Int. Cl.
*G03G 15/00* (2006.01)
*G03G 5/06* (2006.01)
(Continued)

(52) U.S. Cl.
CPC ..... *G03G 15/6597* (2013.01); *G03G 5/06147* (2020.05); *G03G 5/061473* (2020.05);
(Continued)

(58) Field of Classification Search
CPC ............. G03G 15/6597; G03G 15/751; G03G 21/0011; G03G 2215/00518;
(Continued)

(56) References Cited

U.S. PATENT DOCUMENTS

2011/0229809 A1* 9/2011 Nukada .............. G03G 21/0011 399/159
2016/0252869 A1* 9/2016 Hagimoto .......... G03G 21/0011 399/350

(Continued)

FOREIGN PATENT DOCUMENTS

JP 2009237588 A 10/2009

*Primary Examiner* — Sophia S Chen
(74) *Attorney, Agent, or Firm* — BUCHANAN INGERSOLL & ROONEY PC

(57) ABSTRACT

An electrophotographic image forming system forms an electrostatic latent image on at least a photoreceptor, develops an image using an electrostatic charge image developing toner, and removes the toner using a cleaning blade. A tip ridge of the cleaning blade is pressed against a surface of the photoreceptor. The system includes a photosensitive layer of the photoreceptor and a surface protecting layer that is provided on a surface of the photosensitive layer. The surface protecting layer includes a polymerizable monomer having at least two polymerizable groups in a molecule and a polymer of a hole transporting compound having a polymerizable group represented by General formula (1). The tip ridge of the cleaning blade has an edge angle that is obtuse and less than 120° and is pressed against the surface of the photoreceptor at an effective contact angle that is in a range of 8 to 20°.

General formula (1)

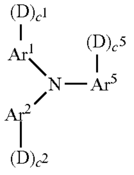

8 Claims, 4 Drawing Sheets

(51) Int. Cl.
*G03G 5/07* (2006.01)
*G03G 5/147* (2006.01)
*G03G 8/00* (2006.01)
*G03G 21/00* (2006.01)

(52) U.S. Cl.
CPC ....... *G03G 5/0732* (2020.05); *G03G 5/14786* (2013.01); *G03G 5/14791* (2013.01); *G03G 5/14795* (2013.01); *G03G 8/00* (2013.01); *G03G 15/751* (2013.01); *G03G 21/0011* (2013.01); *G03G 2215/00518* (2013.01)

(58) Field of Classification Search
CPC ........... G03G 5/06142; G03G 5/06147; G03G 5/061473; G03G 5/072; G03G 5/0732; G03G 5/14704; G03G 5/14786; G03G 5/14791; G03G 5/14795; G03G 8/00
See application file for complete search history.

(56) References Cited

U.S. PATENT DOCUMENTS

2021/0088960 A1* 3/2021 Sekiya ............... G03G 9/09725
2021/0124280 A1* 4/2021 Mori .................... G03G 5/0732

* cited by examiner

ELECTROPHOTOGRAPHIC IMAGE FORMING SYSTEM WITH CLEANING BLADE

TECHNICAL FIELD

The present invention relates to an electrophotographic image forming system. More specifically, the present invention relates to an electrophotographic image forming system in which aggregates derived from an external additive are prevented from adhering to the photoreceptor in a thread-like manner while the charge transporting property of the photoreceptor is ensured, and both excellent wear resistance and good image quality of the photoreceptor can be achieved.

DESCRIPTION OF THE RELATED ART

A curable resin composed of a polyfunctional radical polymerizable monomer is used in a surface protecting layer of a photoreceptor for longer life, higher hardness, and wear reduction.

Furthermore, an aromatic compound with a broad π-conjugated structure is used as a hole transporting material (also referred to as "a hole transporting compound" in the present invention) in the surface protecting layer in order to improve the charge transporting property. In order to achieve both a low-wear design and a charge transporting property, the surface protecting layer using a compound having a radical polymerizable group is known as the hole transporting material.

JP2009-237588A proposes a cleaning blade having a tip ridge formed in an obtuse angle shape and can be used with the surface protecting layer described above to realize a surface pressure distribution that enables both wear reduction and a toner removing function.

In JP2009-237588A, an example of a hole transporting material having the radical polymerizable group is a bifunctional triarylamine compound.

At the same time, image defects may occur on the photoreceptor due to thread-like adhesion of toner particles and aggregates derived from an external additive. The mechanism of the image defects is assumed to be as follows.

Some of the reactive groups of the hole transporting compound having radical polymerizable groups or the radical polymerizable monomer constituting the binder remain in the surface protecting layer as unreacted groups. Aggregates of an external additive (silica particles, lubricant particles, and the like) are likely to be formed near the unreacted groups where adsorption power is locally strong. When such aggregates of the external additive reach the edge of the cleaning blade, they may be trapped in a narrow wedge space which is located downstream of the rotational direction of the photoreceptor with respect to the edge and surrounded by the photoreceptor and the cleaning blade, and may grow into large aggregates after a long-term period of use. As a result, the external additive is transferred from the aggregates to the photoreceptor and adheres to the photoreceptor, and grows into a thread-like adhesion while also entrapping the toner. The presence of the thread-like adhesion results in image defects, which are non-exposed thread-like white space.

JP2009-237588A does not disclose intention to reduce the thread-like adhesion of the above-mentioned aggregates derived from an external additive. In order to reduce the occurrence of the above-mentioned thread-like adhesion, only the adjustment of the surface pressure distribution of the cleaning blades is not effective.

SUMMARY OF THE INVENTION

The present invention was made in view of the above problems and circumstances. The purpose of the present invention is to provide an electrophotographic image forming system that can achieve both excellent wear resistance of the photoreceptor and good image quality by preventing aggregates derived from an external additive from adhering to the photoreceptor in a thread-like manner while maintaining the charge transporting property of the photoreceptor.

In order to solve the above problem, the inventors have examined the cause of the above problem and other factors, and have found the following. The electrophotographic image forming system of the present invention includes a photoreceptor having a surface protecting layer containing a specific hole transporting compound, and a tip ridge of a cleaning blade has a specific edge angle and is pressed against the surface of the photoreceptor so that the effective working angle is within a specific range. According to the above electrophotographic image forming system, aggregates derived from an external additive are prevented from adhering to the photoreceptor in a thread-like manner while the charge transporting property of the photoreceptor is ensured, and both excellent wear resistance and good image quality of the photoreceptor can be achieved.

That is, the above problems related to the present invention are solved by the following means.

To achieve at least one of the abovementioned objects, according to an aspect of the present invention, there is provided an electrophotographic image forming system that forms an electrostatic latent image on at least a photoreceptor, develops an image using an electrostatic charge image developing toner, and removes the electrostatic charge image developing toner using a cleaning blade, a tip ridge of the cleaning blade being pressed against a surface of the photoreceptor, including:

a photosensitive layer of the photoreceptor and a surface protecting layer that is provided on a surface of the photosensitive layer, wherein the surface protecting layer includes a polymerizable monomer having at least two polymerizable groups in a molecule and a polymer of a hole transporting compound having a polymerizable group represented by General formula (1) below, and the tip ridge of the cleaning blade has an edge angle that is obtuse and less than 120° and is pressed against the surface of the photoreceptor at an effective contact angle that is in a range of 8° to 20°, General formula (1)

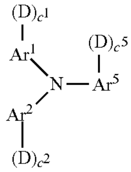

In General formula (1). $Ar^1$ and $Ar^2$ each represent a linking group represented by a structural formula (7) below; $Ar^5$ represents a group represented by a structural formula (8) or a structural formula (9) below; the total number of D that is a sum of $c^1$, $c^2$, and $c^5$ is 1 or 2 when $Ar^5$ is represented by the structural formula (8); the total number of D is 1 when $Ar^5$ is represented by the structural formula (9); D is represented by $—(—(CH_2)_d—(O—(CH_2)_f—)_e—O—CO—C(CH_3)=CH_2)$ or $—(—(CH_2)_d—(O—(CH_2)_f—)_e—O—CO—CH=CH_2)$; d and f each independently represent an integer of 0 to 5; e represents 0 or 1: and $c^1$, $c^2$, and $c^5$ each independently represent 0, 1, or 2.

(7)

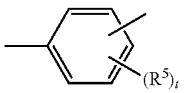

(8)

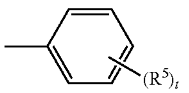

(9)

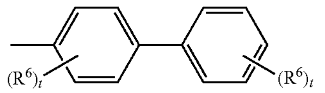

In the structural formulas (7), (8), and (9), $R^5$ and $R^6$ each independently represent one selected from a group consisting of a hydrogen atom, an alkyl group containing 1 to 4 carbon atoms, a phenyl group substituted with an alkoxy group having 1 to 4 carbon atoms, an unsubstituted phenyl group, an aralkyl group having 7 to 10 carbon atoms, and a halogen atom; t represents an integer of 1 to 3; and two of $R^6$ may be optionally bonded together so that the structural formula (9) forms a cyclic structure.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
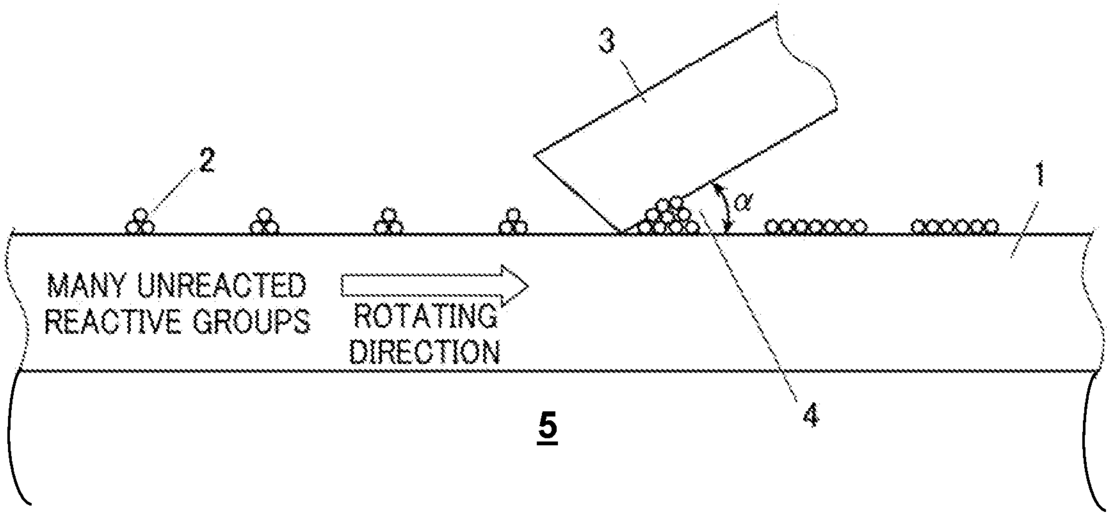
FIG. 1 is a conceptual diagram showing an accumulation state of aggregates when a hole transporting compound and a cleaning blade other than the present invention are used.

Hereinafter, one or more embodiments of the invention will be described with reference to the drawings. However, the scope of the invention is not limited to the disclosed embodiments.

The expression mechanism of the effect or action mechanism of the present invention are not clarified, but are assumed to be as follows.

Some of the reactive groups of the hole transporting compound having polymerizable groups or the polymerizable monomer constituting a binder remain in the surface protecting layer as unreacted groups. Aggregates of an external additive (silica particles, lubricant particles, and the like) are likely to be formed near the unreacted groups where adsorption power is locally strong, become thread-like adhesion, and cause image defects such as white space. Therefore, it is assumed that reducing the aforementioned unreacted groups in the surface protecting layer leads to suppression of image defects caused by the thread-like adhesion.

As a result of further examination, the inventors of the present application have found the following. When the hole transporting compound contained in the surface protecting layer of the photoreceptor is a compound having a single functional (also referred to as "monofunctional") polymerizable group or a compound having a π-conjugated moiety with a small molecular size, steric hindrance during the curing reaction is reduced. As a result, the amount of remaining unreacted groups in the surface protecting layer can be reduced.

When the polymerizable group is bifunctional, as a result of the reaction of the first reactive group of the hole transporting material, the hole transporting material is directly bonded to the binder and is constrained by the binder. Therefore, the steric hindrance becomes large in the reaction of the second reactive group. However, even when the radical polymerizable group is bifunctional, unreacted groups can be reduced if the molecular size of the π-conjugated moiety is small since the hole transporting compound bound to the binder via the first reactive point has a relatively high degree of freedom of motion.

Also, when tip ridge of the cleaning blade is pressed with its effective contact angle $\theta i$ appropriately large, the wedge space is secured between the photoreceptor and the cleaning blade at the downstream side of the cleaning blade edge in the rotating direction. As a result, the deposition of aggregates on the edge of the cleaning blade can be suppressed even when the aggregates reach the cleaning blade.

When the edge of the cleaning blade is right-angled, a large effective contact angle $\theta_1$ leads to a large amount of the blade edge to be pulled in, which may cause cleaning defects due to blade flipping and increased vibration. However, the edge having an obtuse shape results in a small amount of the edge to be pulled in. Therefore, the effective contact angle can be set to a large angle without causing the blade flipping or increased vibration.

As a result of the synergistic effect of the appropriate selection of the above hole transporting compound and the specific configuration of the cleaning blade, the charge transporting property of the photoreceptor is ensured, aggregates derived from an external additive are prevented from adhering in a thread-like manner, and both excellent wear resistance and good image quality of the photoreceptor can be achieved.

The electrophotographic image forming system of the present invention forms an electrostatic latent image on at least a photoreceptor, develops an image using an electrostatic charge image developing toner, and removes the electrostatic charge image developing toner using a cleaning blade, a tip ridge of the cleaning blade being pressed against a surface of the photoreceptor, and includes a photosensitive layer of the photoreceptor and a surface protecting layer that is provided on a surface of the photosensitive layer. The surface protecting layer includes a polymerizable monomer having at least two polymerizable groups in a molecule and a polymer of a hole transporting compound having a polymerizable group represented by General formula (1) below, and the tip ridge of the cleaning blade has an edge angle that is obtuse and less than 120° and is pressed against the surface of the photoreceptor at an effective contact angle that is in a range of 8 to 20°. These features are technical features common to or corresponding to the following implementation.

In a preferred embodiment of the present invention, from the viewpoint of expressing the effect of the present invention, a ratio (L/d) of a free length (L) of the cleaning blade to a thickness (d) of the cleaning blade is 3.5 or more.

This is because the surface pressure at the tip of the cleaning blade is not completely uniform in the longitudinal direction. Specifically, there are areas where the surface pressure is locally high and areas where the surface pressure is locally low in the longitudinal direction due to minute vibrations of the blade tip that occur during driving. In the areas where the surface pressure is locally low, the additive tends to slip through the nip of the cleaning blade, and easily aggregates on the edges.

When the ratio of the free length L to the thickness d is 3.5 or more, the blade rubber portion bends and bites into the photoreceptor when in contact with the photoreceptor. Therefore, even when vibration is generated during driving, surface pressure distribution fluctuations in the longitudinal direction will be relatively small. This can more effectively suppress the occurrence of aggregates of the external additive.

In a preferred embodiment of the present invention, $Ar^5$ in General formula (1) represents a linking group represented by the structural formula (9), and the total number of D is 1. By having a biphenyl structure, which is a structure with wider x-conjugation compared to the triphenylamine skeleton, the desired charge transporting function can be achieved with a smaller blending ratio with respect to the entire surface protecting layer. As a result, unreacted groups in the surface protecting layer can be further reduced.

In a preferred embodiment of the present invention, at least one of d and e in the structural formula of D of the aforementioned hole transporting compound is preferably 1 or more. Compared to the case where the (meth)acryloyl group, which is a polymerizable reactive group, is directly connected to a highly rigid π-conjugated moiety (aromatic ring moiety) (in other words, when the both d and e are 0), the reactive group moiety is not bound to the π-conjugated moiety during the curing reaction and can move relatively freely. As a result of this, the residual amount of unreacted groups can be further reduced.

For the following reasons, the effective contact angle is preferably in a range of 9 to 17°, and the edge angle is preferably in a range of 95 to 110°.

When the effective contact angle $\theta_1$ is kept reasonably large, the wedge space is secured between the photoreceptor and the cleaning blade at the downstream side of the cleaning blade edge in the rotating direction. As a result, the deposition of aggregates on the blade edge is suppressed even when the aggregates reach the cleaning blade.

However, a too large effective contact angle $\theta_1$ leads to a large amount of the blade edge to be pulled in, which may cause cleaning defects due to blade flipping and increased stick-slip vibration. Therefore, the effective contact angle $\theta_1$ is preferably within the aforementioned range.

In the present invention, the edge angle $\theta_e$ of the cleaning blade is an obtuse angle, which results in a smaller amount of the edge of the cleaning blade itself to be pulled in. Therefore, the effective contact angle $\theta_1$ can be larger than that in the case where the edge of the cleaning blade is not in an obtuse shape.

When the above edge angle $\theta_e$ is too large, the surface pressure at the blade edge is small and allows the external additive to easily slip through the blade. As a result, even when the effective contact angle $\theta_1$ is sufficient, the additive may easily accumulate on the blade edge.

When the effective contact angle $\theta_1$ and the edge angle $\theta_e$ are set within the ranges according to the present invention, the wedge space is secured between the photoreceptor and the cleaning blade at the downstream side of the cleaning blade edge in the rotating direction. As a result, the deposition of aggregates on the blade edge is suppressed even when the aggregates reach the cleaning blade.

Preferably, the photoreceptor further includes a fatty acid metal salt, and an amount of the fatty acid metal salt in the photoreceptor is 0.15% by mass or more with respect to toner matrix particles. This is because, when the surface of the photoreceptor is coated with the fatty acid metal salt so as to be hydrophobic, the generation of aggregates can be more effectively suppressed even in the presence of unreacted groups.

Preferably, the hole transporting compound is contained in a range of 30 to 70% by mass with respect to the surface protecting layer. This is because unreacted groups in the surface protecting layer can be further reduced.

In the following, detailed explanations of the present invention, its components, and embodiments and modes for carrying out the present invention will be given. In this application, a range using "to" means that the numerical values before and after it are included as lower and upper limits.

<<Outline of Electrophotographic Image Forming System of Present Invention>>

Figure 2:
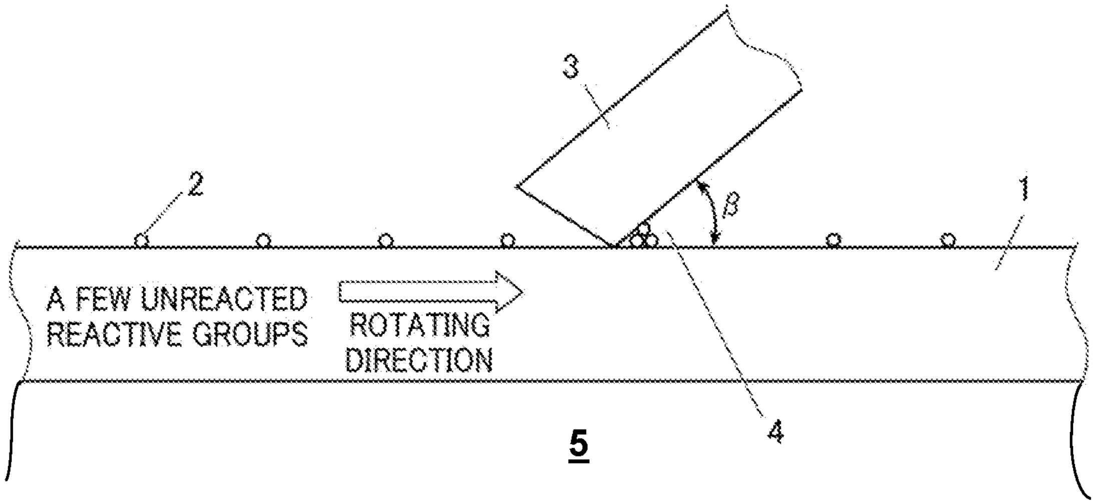
FIG. 2 is a conceptual diagram showing an accumulation state of aggregates when a hole transporting compound and a cleaning blade related to the present invention are used.

In the electrophotographic image forming system of the present invention, the following processes are performed: forming an electrostatic latent image on at least a photoreceptor; developing the image using an electrostatic charge image developing toner; and removing the electrostatic charge image developing toner using a cleaning blade whose tip ridge is pressed against the surface of the photoreceptor. The photoreceptor includes a photosensitive layer 5 and a surface protecting layer 1 provided on the surface of the photosensitive layer 5 (FIGS. 1 and 2). The surface protecting layer 1 contains a polymerizable monomer having at least two polymerizable groups in the molecule and a polymer of a hole transporting compound having a polymerizable group represented by General formula (1). The tip ridge of the cleaning blade has an edge angle $\theta_e$ that is obtuse and less than 120° and is pressed against the surface of the photoreceptor at an effective contact angle $\theta_1$ that is in the range of 8° to 20°.

FIG. 1 is a conceptual diagram showing the accumulation state of aggregates when a hole transporting compound and a cleaning blade other than the present invention are used.

For example, some of the reactive groups of the hole transporting compound having radical polymerizable groups or the radical polymerizable monomer constituting the binder remain in the surface protecting layer 1 as unreacted groups. When a hole transporting compound not related to the present invention is used in the surface protecting layer, there are many steric hindrances during the curing reaction and a large amount of unreacted reactive groups remain in the surface protecting layer. So, the lubricant particles 2 of an external additive tends to adhere locally. As a result, a large amount of adhesion of aggregates derived from the external additive accumulated at the cleaning blade 3, and tends to become thread-like adhesion and to cause image defects such as white space.

On the other hand, FIG. 2 is a conceptual diagram showing the accumulation state of aggregates when a hole transporting compound and a cleaning blade related to the present invention are used.

The hole transporting compound related to the present invention included in the surface protecting layer 1 is a compound having a monofunctional radical polymerizable group or a compound having a small molecular size of π-conjugated moiety. This reduces steric hindrance during the curing reaction and the residual amount of unreacted reactive groups in the surface protecting layer. Therefore, localized adhesion of the lubricant particles 2 of the external additive is less likely to occur. Furthermore, the wedge space 4 can be larger because of the effective contact angle of the cleaning blade 3 of p, which is slightly larger than a shown in FIG. 1. This can further suppress accumulation of aggregates derived from the external additive. Therefore, the thread-like adhesion is less likely to occur, and image defects such as white space can be significantly suppressed.

In the following, the configuration for the present invention will be described in detail.

[1] Electrophotographic Photoreceptor

The electrophotographic photoreceptor related to the present invention is an electrophotographic photoreceptor (hereinafter also simply referred to as "photoreceptor") for use in an electrophotographic photosensitive image forming apparatus. The electrophotographic photoreceptor includes a conductive support, a photosensitive layer, and a surface protecting layer.

The surface protecting layer of the above photoreceptor includes a polymerizable monomer having at least two polymerizable groups in the molecule and a hole transporting compound having a structure represented by the following General formula (1).

However, the photoreceptor may have a composition other than the above as long as the purpose and effect of the present invention are not impaired. The photoreceptor may have other layers such as an intermediate layer between the conductive support and the photosensitive layer, for example, if necessary. The layer composition of the photoreceptor is not particularly restricted, and may be selected according to the performance and application required for the photoreceptor.

For example, the conductive support, a charge generating layer, a charge transporting layer, and a surface protecting layer may be stacked in this order. Alternatively, the conductive support, a charge generating and transporting layer, and the surface protecting layer may be stacked in this order.

Alternatively, the conductive support, the intermediate layer, the charge generating layer, the charge transporting layer, and the surface protecting layer may be stacked in this order. Alternatively, the conductive support, the intermediate layer, the charge generating and transporting layer, and the surface protecting layer may be stacked in that order.

[1.1] Surface Protecting Layer

First, the "surface protecting layer," which is a feature of the invention, will be explained.

The surface protecting layer of the present invention is characterized by including a polymerizable monomer having at least two polymerizable groups in the molecule and a polymer of a hole transporting compound having a polymerizable group represented by General formula (1).

The polymerizable monomer having at least two polymerizable groups in the molecule is generally called a "polyfunctional polymerizable compound" or a "polyfunctional polymerizable monomer".

The polyfunctional polymerizable compound includes a polyfunctional polymerizable compound having a hole transporting property and a polyfunctional polymerizable compound having no hole transporting property. In the present invention, the "polymerizable monomer having at least two polymerizable groups in the molecule" refers to the "polyfunctional polymerizable compound having no hole transporting property".

The polyfunctional polymerizable compound having no hole transporting property is preferably a monomer having radical polymerizable functional groups that is polymerized (cured) using a radical polymerization initiator to form a binder resin of the photoreceptor, for example. The polyfunctional polymerizable compound having no hole transporting property is preferably a cross-linkable polymerizable compound from the viewpoint of maintaining high durability. The crosslinkable polymerizable compound is specifically a polymerizable compound having two or more radical polymerizable functional groups, such as polystyrene, polyacrylate, or polycarbonate. The specifically preferred compounds are detailed later.

The term "hole transporting property" related to the present invention means that a compound has a hole transportability greater than an electron transportability. In other words, the hole mobility is greater than the electron mobility in the compound.

An ionization energy (the energy required to remove an electron from a molecule in a neutral state to ionize it) is preferably 6.2 eV or less in terms of easy hole injection, and particularly 4.5 to 6.2 eV in terms of prevention of compound oxidation.

As for the hole transportability, a drift mobility of $1\times10^{-7}$ $cm^Z/Vsec$ or more is preferred.

The method to measure the hole or electron mobility is not particularly limited. Examples of a specific method include the following.

(1) Time-of-Flight Measurements (Method to Calculate the Mobility from the Measurement of the Traveling Time of the Charge in an Organic Layer)

(2) Method to Calculate the Mobility from the Voltage Characteristics of the Space Charge Limiting Current (3) Method to Determine the Mobility from the Peak Frequency Measured by Impedance Spectroscopy The "polymerizable compound having a hole transporting property" may be, for example, a polycyclic aromatic compound, a heterocyclic compound, a hydrazone compound, a styryl compound, an enamine compound, a benzidine compound, a triarylamine compound, or a compound having a group derived from these. Among these, a triarylamine compound and a benzidine compound are preferred, specifically compounds having the structure represented by General formula (1) described later.

As well as the polyfunctional polymerizable compound, the "polymerizable compound having a hole transporting property" may be a polymerizable compound having one polymerizable group in the molecule (also referred to as a "monofunctional polymerizable compound" or a "monofunctional polymerizable monomer") included in the compound having the structure represented by General formula (1).

Therefore, the surface protecting layer related to the present invention is a cured product of a coating solution (also referred to as a "surface protecting layer forming coating solution") including a polyfunctional or monofunctional polymerizable compound having a hole transporting property and a polyfunctional polymerizable compound having no hole transporting property.

Furthermore, the coating solution preferably includes a photoinitiator and inorganic particles, and may also include known charge transporting substances other than a polyfunctional or monofunctional polymerizable compound having a hole transporting property.

Hereinafter, we will explain (1) a polyfunctional or monofunctional polymerizable compound having a hole transporting property (the hole transporting compound having a polymerizable group having a structure represented by General formula (1) according to the present invention), (2) the polyfunctional polymerizable compound having no hole transporting property, (3) the photoinitiator, (4) the inorganic particles, (5) other additives, and (6) physical properties and the like of the surface protecting layer.

(1) Hole Transporting Compound Having a Polymerizable Group Represented by General Formula (1)

As described above, when the hole transporting compound included in the surface protecting layer of the photoreceptor is a compound having a monofunctional radical polymerizable group or a compound having a small molecular size of the π-conjugated moiety, steric hindrance during the curing reaction and the residual amount of unreacted reactive groups in the surface protecting layer can be reduced.

When the polymerizable group is bifunctional, as a result of the reaction of the first reactive group of the hole transporting material, the hole transporting material is directly bonded to the binder and is constrained by the binder. Therefore, the steric hindrance becomes large in the reaction of the second reactive group. However, even when the radical polymerizable group is bifunctional, unreacted groups can be reduced if the molecular size of the π-conjugated moiety is small since the hole transporting compound bound to the binder via the first reactive point has a relatively high degree of freedom of motion.

The compound having the structure represented by General formula (1) included in the surface protecting layer according to the present invention is represented by the following structural formula.

General formula (1)

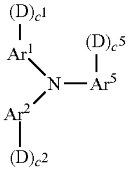

In the formula, $Ar^1$ and $Ar^2$ each represent a linking group represented by the following structural formula (7); $Ar^5$ represents a group represented by the following structural formula (8) or (9); the total number of D ($c^1+c^2+c^5$) is 1 or 2 when $Ar^3$ is represented by structural formula (8); and the total of D ($c^1+c^2+c^5$) is 1 when $Ar^5$ is represented by structural formula (9).

(7)

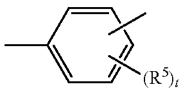

-continued (8)

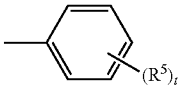

(9)

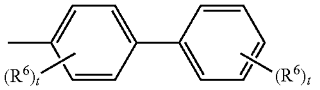

D is represented by $-(-(CH_2)_d-(O-(CH_2)_e)_k-O-CO-C(CH_3)=CH_2)$ or $-(-(CH_2)_d-(O(CH_2)_e-)_e-O-CO-CH=CH_2)$; d and f each independently represent an integer of 0 to 5; e represents 0 or 1; and $c^1$ to $c^5$ each independently represent 0, 1 or 2.

$R^5$ and $R^6$ each independently represent one selected from the group consisting of a hydrogen atom, an alkyl group containing 1 to 4 carbon atoms, a phenyl group substituted with an alkoxy group having 1 to 4 carbon atoms, an unsubstituted phenyl group, an aralkyl group having 7 to 10 carbon atoms, and a halogen atom, t represents an integer of 1 to 3. Two of $R^6$ may be bonded together so that the above structural formula (9) forms a cyclic structure.

When the $Ar^5$ is represented by the structural formula (9) and the total number of D is 1, the hole transporting compound has a biphenyl structure with wider π-conjugation compared to the triphenylamine skeleton and can express the desired charge transport function even at a low blending ratio with respect to the entire surface protecting layer. This is preferable from the viewpoint that unreacted groups in the surface protecting layer can be further reduced.

At least one of d and e in the structural formula of D of the aforementioned hole transporting compound is preferably 1 or more. Compared to the case where the (meth) acryloyl group, which is a polymerizable reactive group, is directly connected to a highly rigid π-conjugated moiety (aromatic ring moiety) (in other words, when the both d and e are 0), the reactive group moiety is not bound to the π-conjugated moiety during the curing reaction and can move relatively freely. As a result of this, the residual amount of unreacted groups can be further reduced.

Hole transporting compounds having the structure represented by the General formula (1) are specifically shown below, but are not limited to the following examples.

Compounds in which the total number of D is 1, that is, compounds having one (meth)acryloyl group, are exemplified below.

1-11

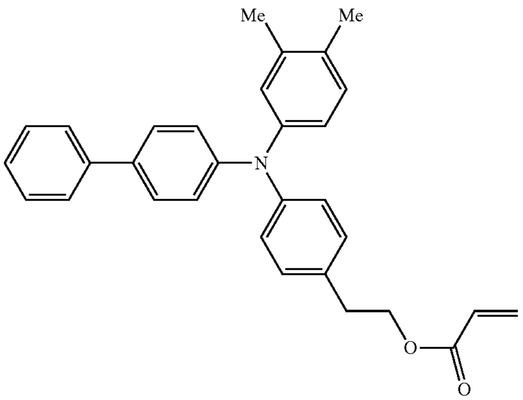

-continued
1-12
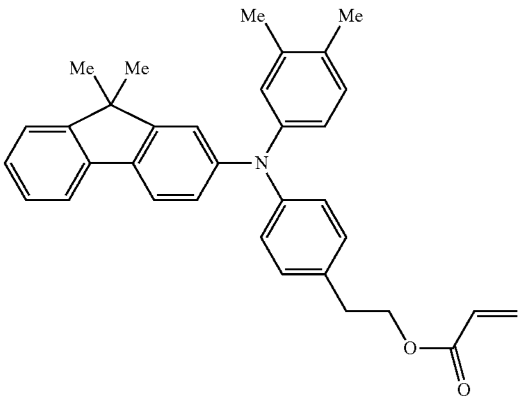
1-13
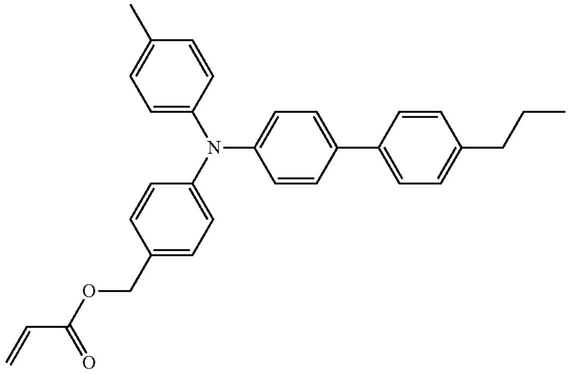
1-14
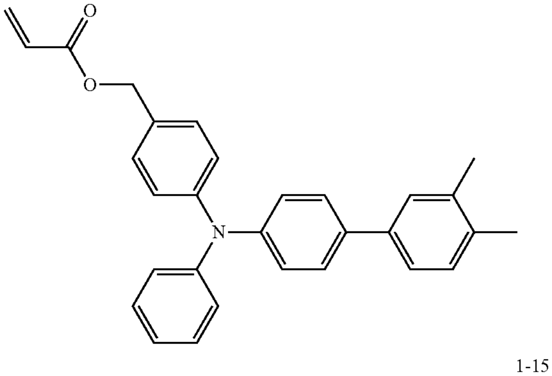
1-15
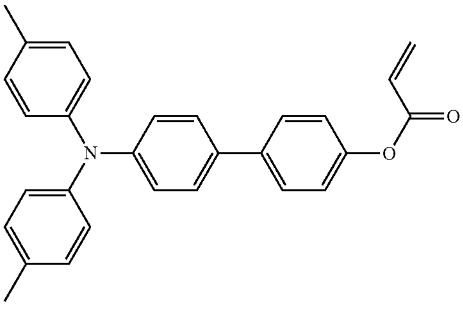
-continued
1-16
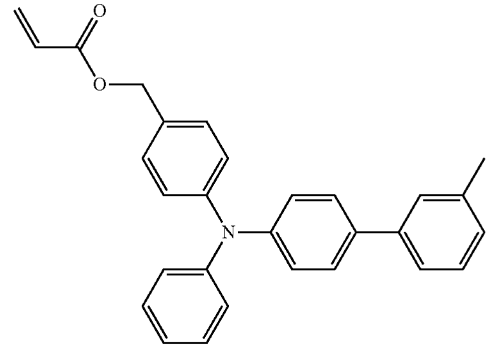
1-17
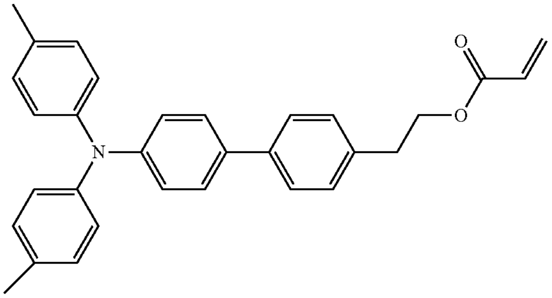
1-18
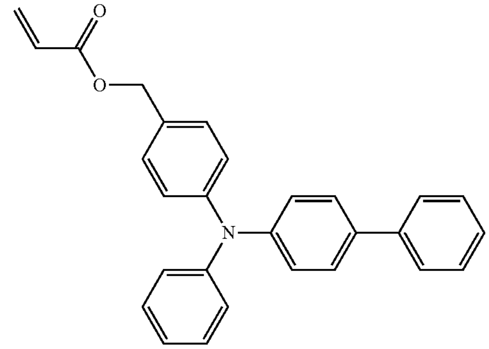
1-19
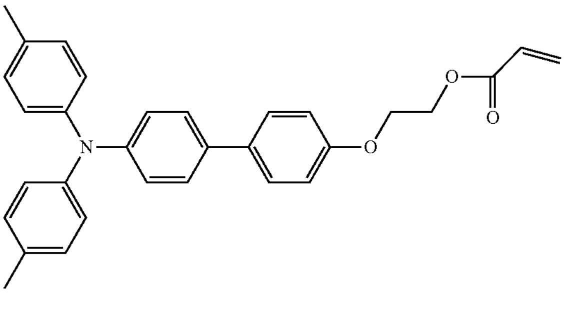

-continued
1-20
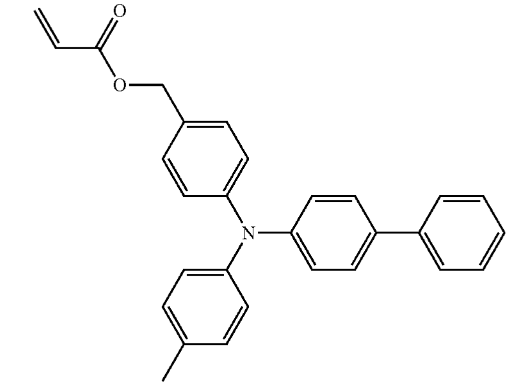
1-1
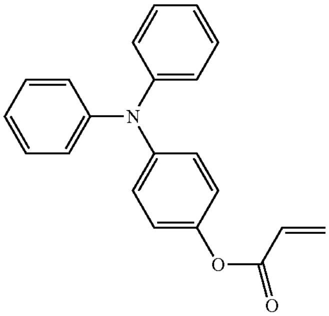
1-2
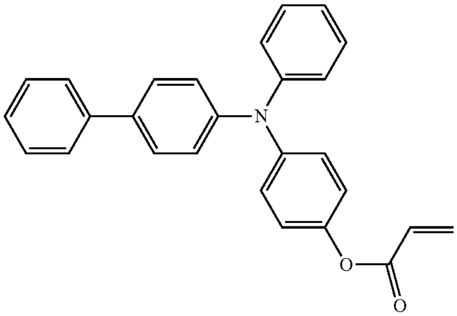
1-3
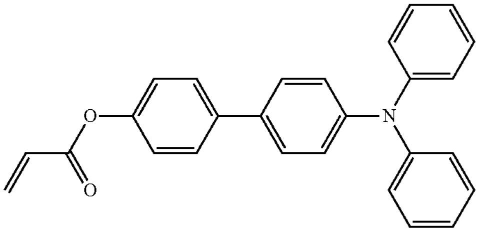
1-4
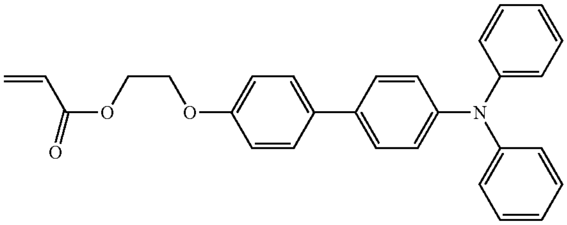
-continued
1-5
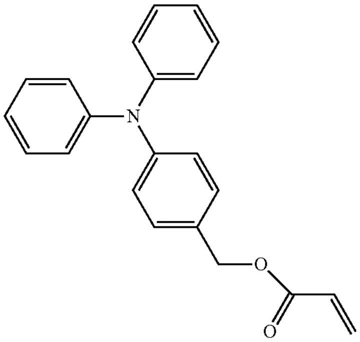
1-11
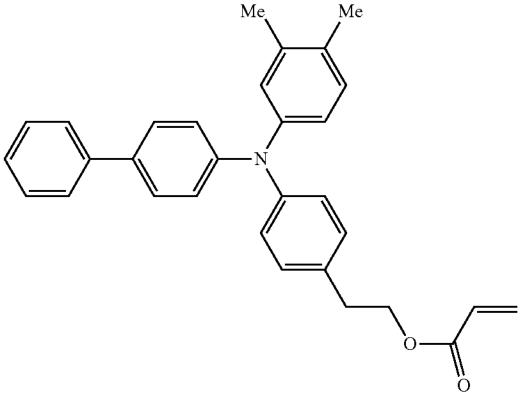
1-12
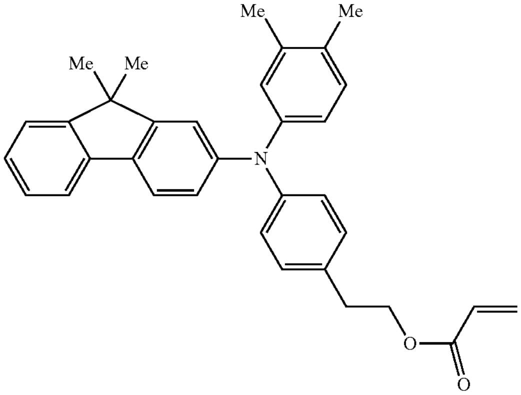
1-13
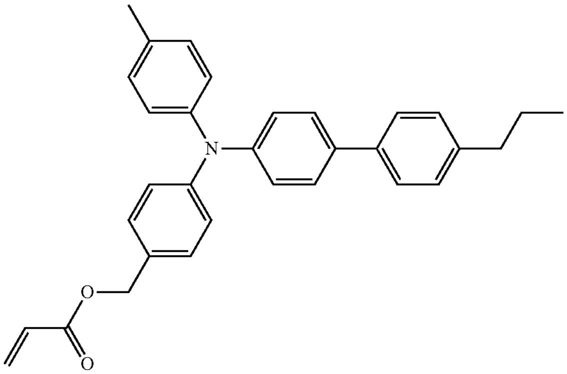

-continued
1-14
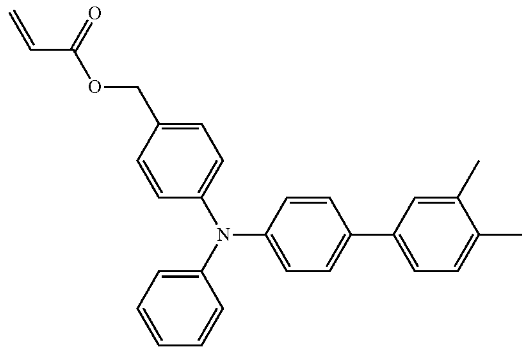
1-15
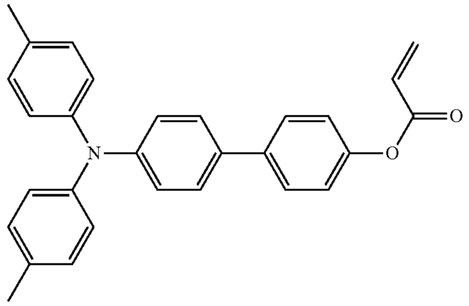
1-16
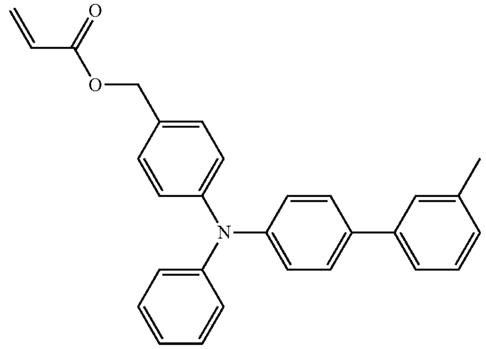
1-17
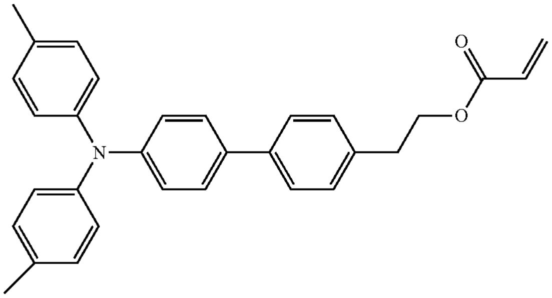
-continued
1-18
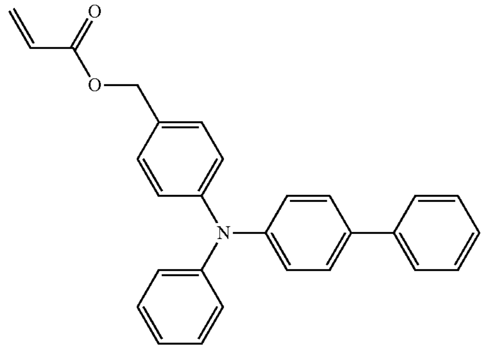
1-19
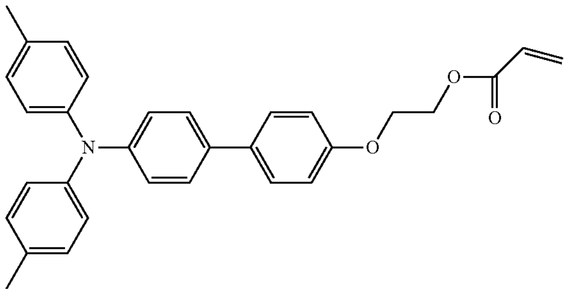
1-20
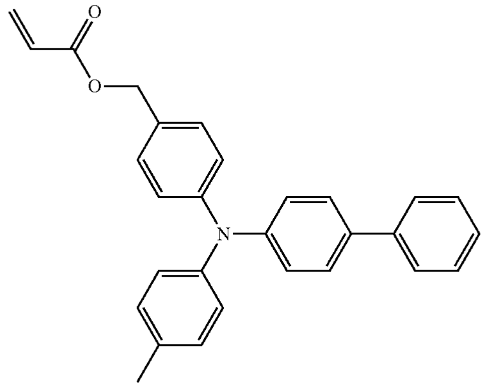
1-21
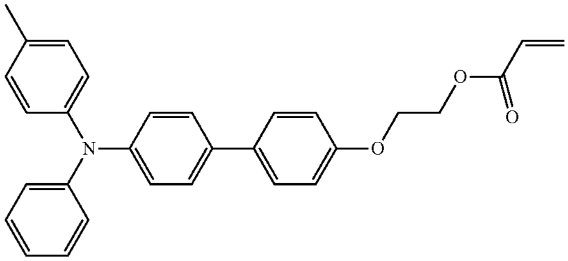

-continued
1-22
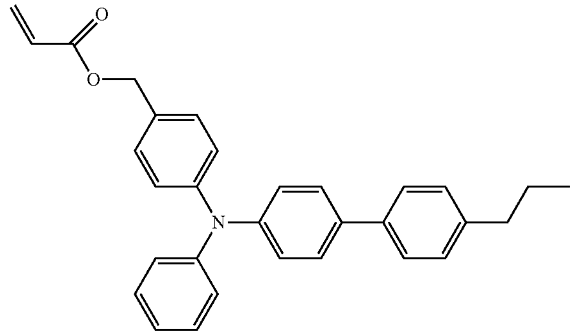
1-23
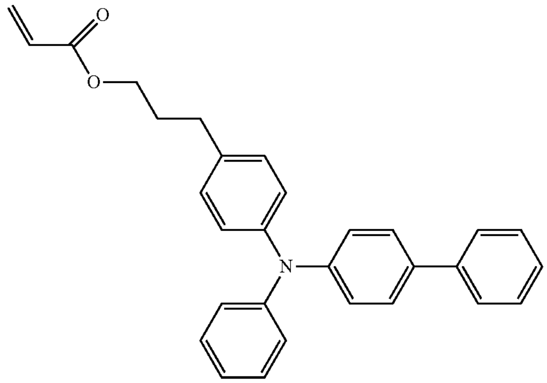
Compounds in which $Ar^3$ is represented by structural formula (8) and the total number of D is 2, that is, compounds having two (meth)acryloyl groups, are exemplified below.
2-1
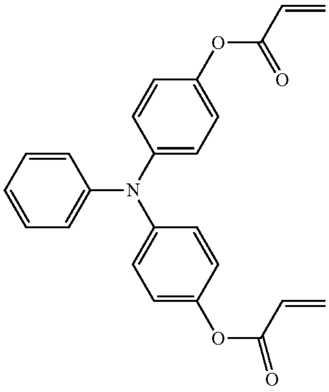
-continued
2-2
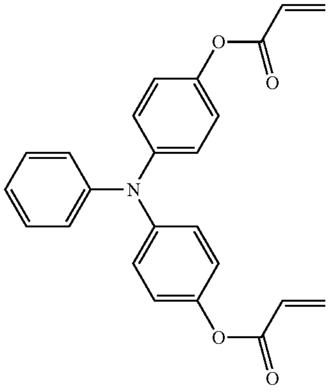
2-3
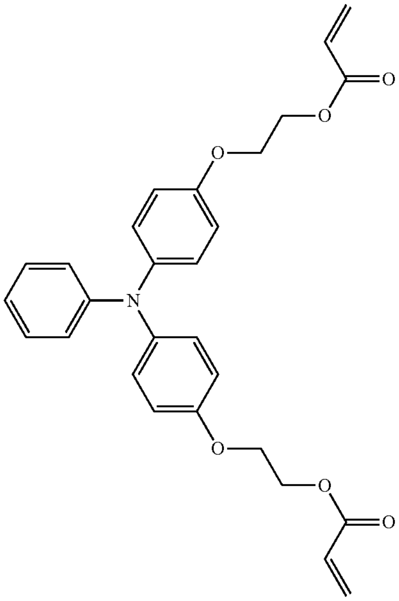
2-4
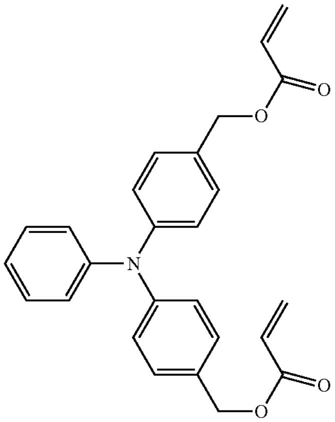

-continued 2-5

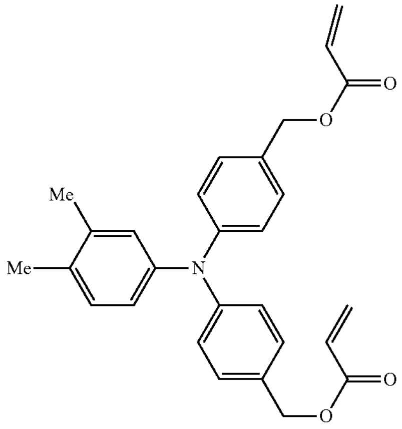

2-6

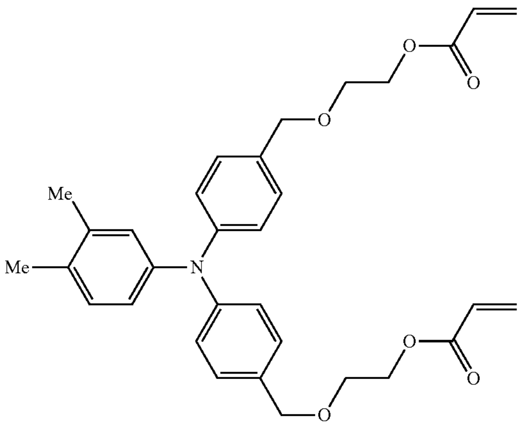

2-7

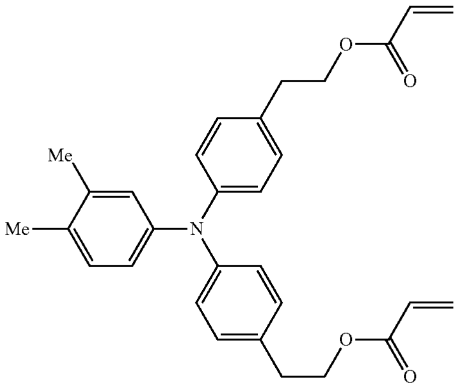

The hole transporting compound having the structure represented by General formula (1) exemplified above can be synthesized according to the synthetic route for a compound having the structure represented by General formulas A1, A2 or A3 shown below.

(Synthetic Route of Compound of General Formula A1)

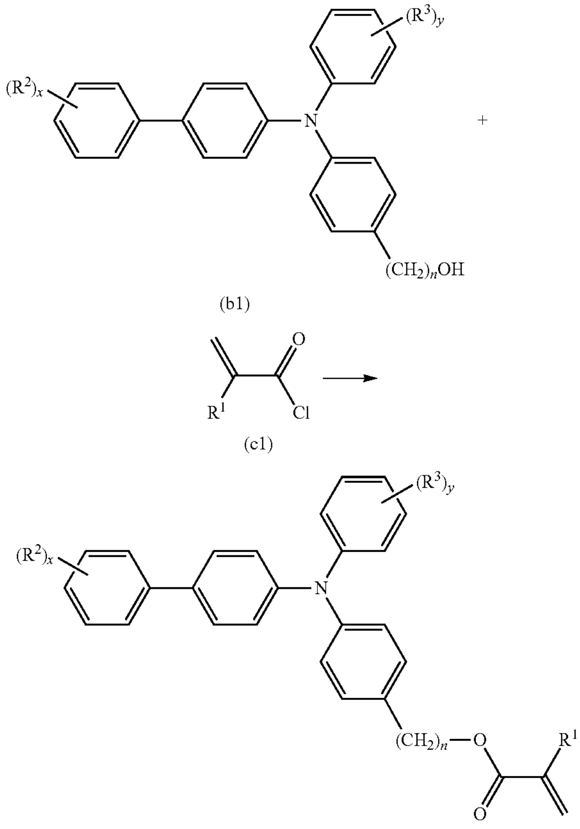

(b1) (c1) (A1)

In General formula A1. $R^1$ represents a hydrogen atom or a methyl group: $R^2$ and $R^3$ each independently represent an alkyl group having 1 to 3 carbon atoms; x and y each independently represent an integer of 0 to 2; n represents an integer of 1 Lo 3; when there are two or more $R^2$, the two or more $R^2$ may be the same or different from each other; and when there are two or more $R^3$, the two or more $R^3$ may be the same or different from each other.

(Synthetic Route of Compound of General Formula A2)

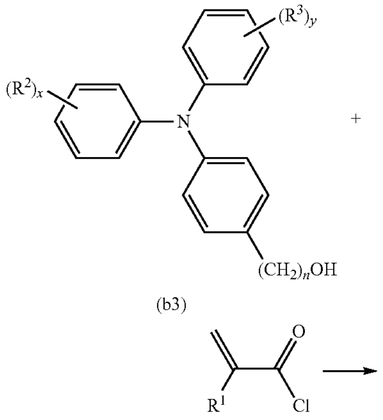

(b3) (c1)

-continued

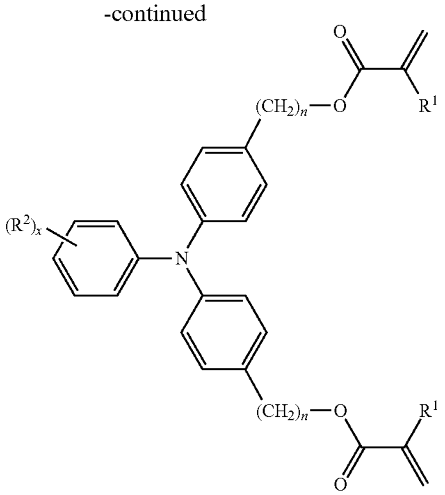

(A3)

In General formula A2. $R^1$ represents a hydrogen atom or a methyl group: $R^2$ and $R^3$ each independently represent an alkyl group having 1 to 3 carbon atoms: x and y each independently represent an integer of 0 to 2; n represents an integer of 1 to 3: when there are two or more $R^2$, the two or more $R^2$ may be the same or different from each other; and when there are two or more $R^3$, the two or more $R^3$ may be the same or different from each other.

(Synthetic Route of Compound of General Formula A3)

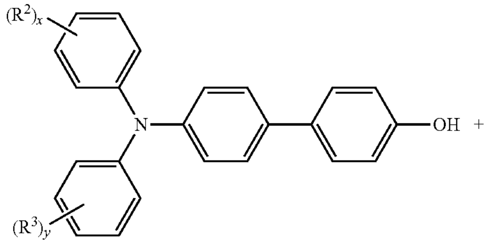

(b2)

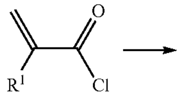

(c1)

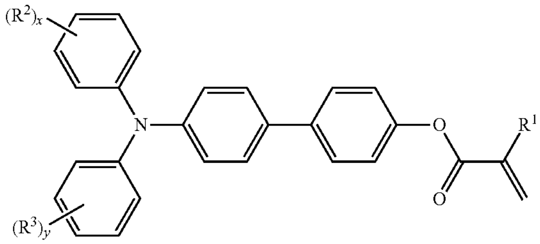

(A2)

In General formula A3, $R^1$ represents a hydrogen atom or a methyl group: $R^2$ represents an alkyl group having 1 to 3 carbon atoms: x represents an integer of 0 to 2; n represents an integer of 1 to 3: when there are two or more $R^2$, and the two or more $R^2$ may be the same or different from each other.

It is preferable that the hole transporting compound is contained in the range of 30 to 70% by mass with respect to the surface protecting layer from the viewpoint of being able to further reduce unreacted groups in the surface protecting layer. In such a case, in the hole transporting compound, $Ar^5$ is preferably a linking group represented by the structural formula (9), and the total number of D ($c^1+c^2+c^5$) is preferably 1.

The hole transporting compounds may be used alone or in combination.

(2) Polyfunctional Polymerizable Compound Having No Hole Transporting Property

The polyfunctional polymerizable compound having no hole transporting property and two or more polymerizable groups in the molecule (polyfunctional polymerizable monomer) are specifically shown below, but are not limited to the following examples.

M1

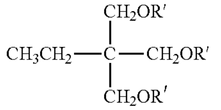

M2

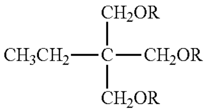

M3

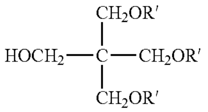

M4

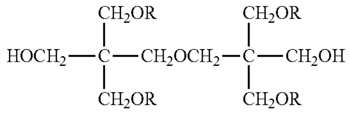

M5

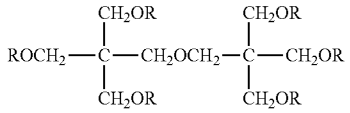

M6

$CH_3CH_2C{-}\!(CH_2OC_3H_6OR)_3$

M7

$CH_3CH_2C{-}\!(CH_2CH_2OR)_3$

M8

$R{-}\!(OC_3H_6)_3{-}OR$

M9

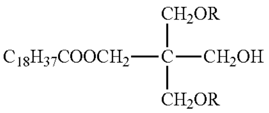

M10

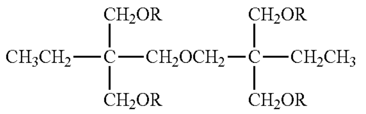

M11

$(ROCH_2)_4C$

M12

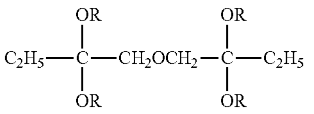

-continued

M13

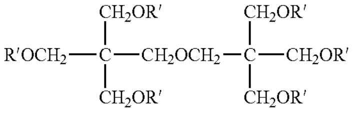

M14

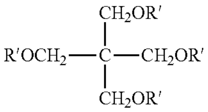

In the chemical formulas showing the above Example Compounds M1 to M14. R represents an acryloyl group ($CH_2$=CHCO—) and R' represents a methacryloyl group ($CH_2$=$CCH_3$CO—).

(3) Photoinitiator

The photoinitiators used in the present invention are not particularly limited. However, from the viewpoint of more reliably suppressing side effects such as a decrease in memory resistance, for example, single molecule photoinitiators having an acylphosphine oxide structure or an O-acyl oxime structure are preferred. These may be used alone or in combination. In the present invention, a single-molecule photoinitiator refers to a photoinitiator that functions as a single molecule, while a bimolecule photoinitiator refers to a photoinitiator that functions only when two or more molecules are set together.

Specific examples of photoinitiators having an acylphosphine oxide structure are shown below.

Irugacure TPO

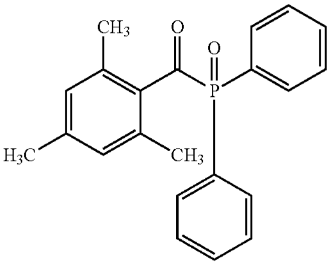

Irugacure 819

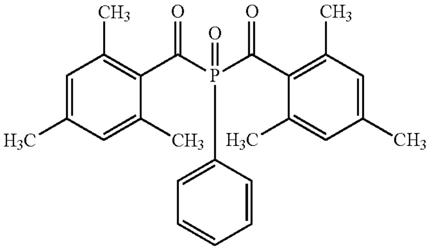

Of the two above, Irgacure TPO (manufactured by BASF Japan Ltd.) and Irgacure 819 (manufactured by BASF Japan Ltd.), Irgacure 819 is preferred.

In addition, photoinitiators having an O-acyloxime structure include Irgacure OXE02 (manufactured by BASF Japan Ltd.) and the compounds shown below.

PI-8

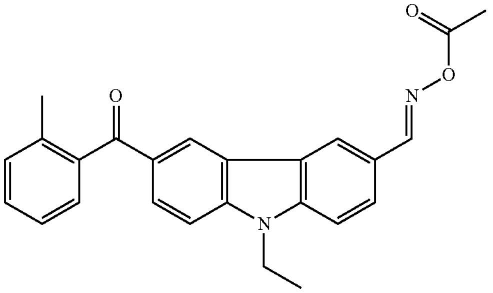

PI-9

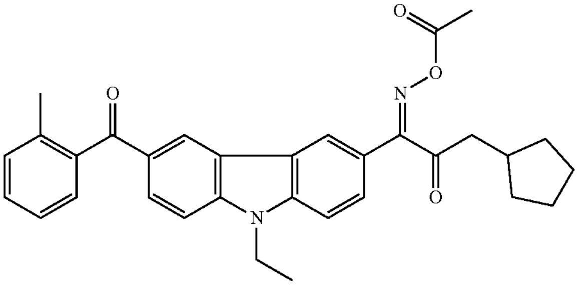

In the present invention, the photoinitiators having the O-acyloxime structure preferably have the following General formula (a-3).

General formula (a-3)

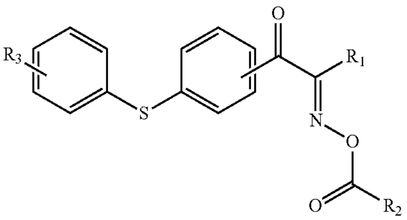

In General formula (a-3), $R_1$ and $R_2$ each independently represent a hydrogen atom, an alkyl group having 1 to 6 carbon atoms that may have a substituent, a cycloalkyl group having 3 to 6 carbon atoms that may have a substituent, or an aryl group that may have a substituent.

$R_3$ represents a hydrogen atom, an alkyl group having 1 to 6 carbon atoms that may have a substituent, an alkoxy group having 1 to 6 carbon atoms that may have a substituent, an aryl group that may have a substituent, a halogen atom, a cyano group, a nitro group, a hydroxy group, or a carbonyl group that may have a substituent.

Examples of the alkyl group in General formula (a-3) include a methyl group, an ethyl group, a propyl group, an isopropyl group, a (t)butyl group, a pentyl group, a hexyl group, an octyl group, a dodecyl group, a tridecyl group, a tetradecyl group, a pentadecyl group, benzyl group, and the like. Examples of the cycloalkyl group in General formula (a-3) include a cyclopropyl group, a cyclobutyl group, a cyclopentyl group, a cyclohexyl group, and the like. Examples of the aryl group in General formula (a-3) include a phenyl group, a p-chlorophenyl group, a mesityl group, a tolyl group, a xylyl group, a naphthyl group, an anthryl group, an azulenyl group, an acenaphthenyl group, a fluorenyl group, a phenanthryl group, an indenyl group, a pyrenyl group, a biphenylyl group, and the like. Examples of the alkoxy group in General formula (a-3) include a methoxy group, an ethoxy group, a propyloxy group, a butoxy group, a pentyloxy group, a hexyloxy group, an octyloxy group, and a dodecyloxy group.

These substituents may be further substituted by the substituents listed above, and they may also be further condensed with each other to form a ring.

Specific examples of the compound having the structure represented by the above General formula (a-3) are shown below.

B-1 (OXE01)

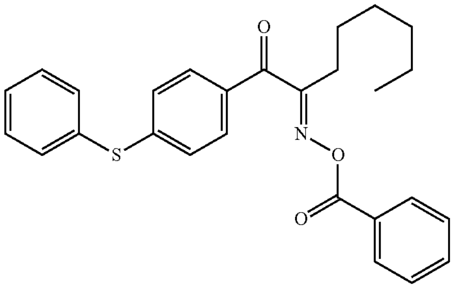

B-2

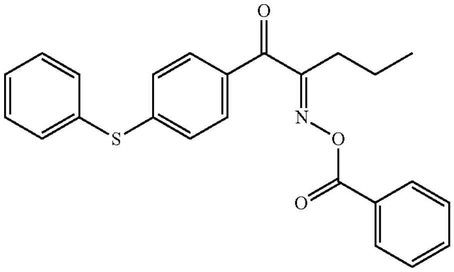

B-3

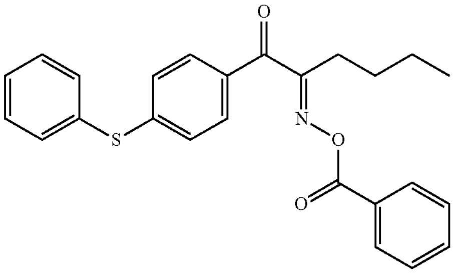

B-4

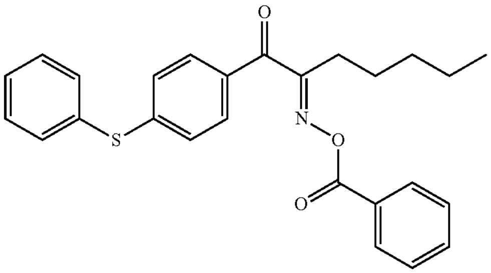

-continued

B-5

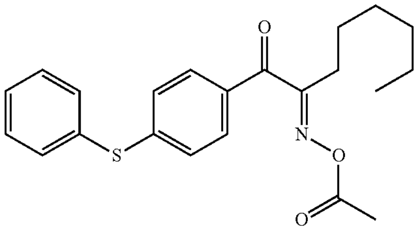

B-6

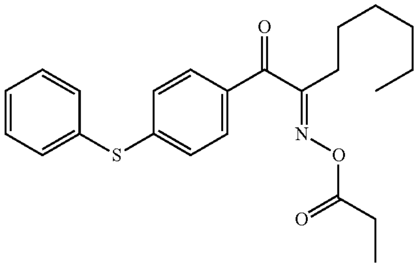

B-7

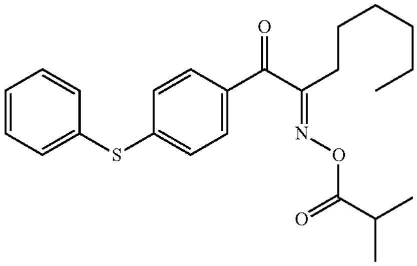

B-8

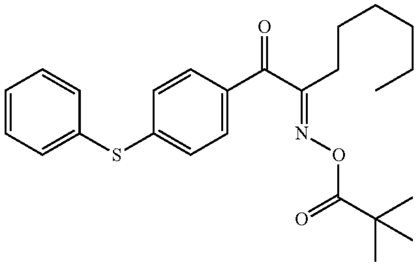

B-9

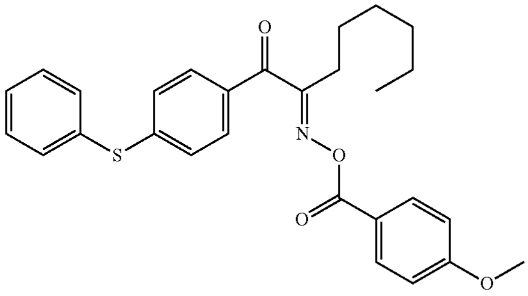

-continued
B-10
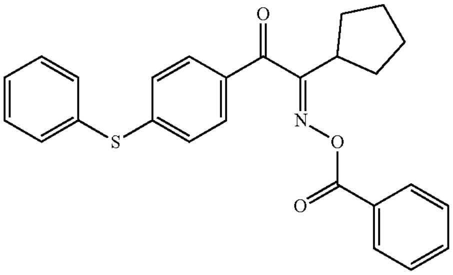
B-11
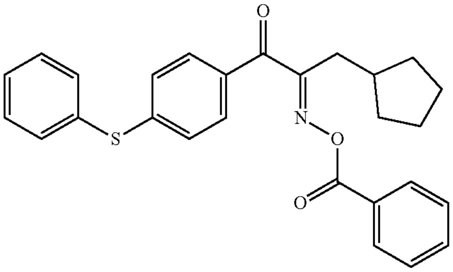
B-12
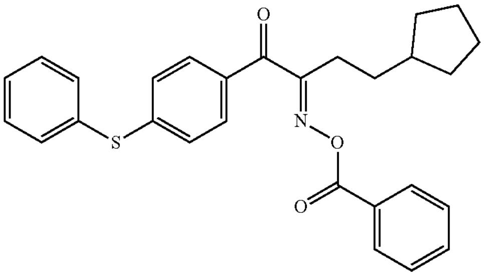
B-13
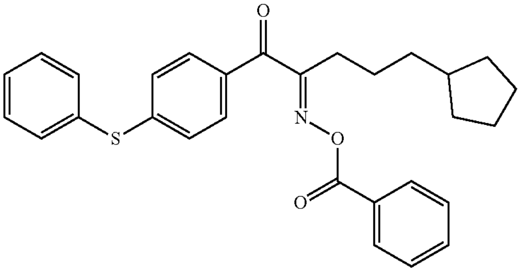
B-14
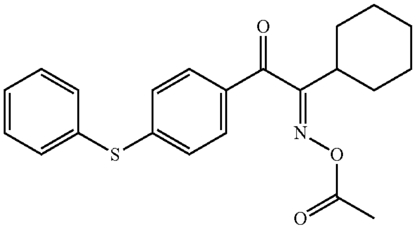
B-15
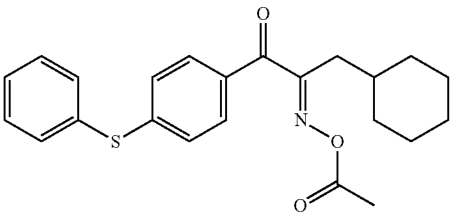
-continued
B-16
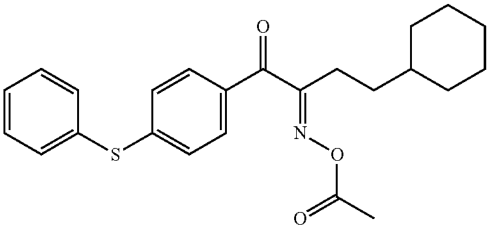
B-17
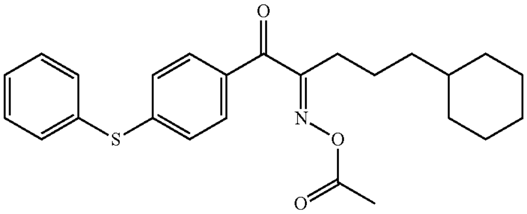
B-18
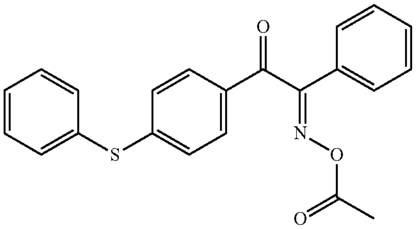
B-19
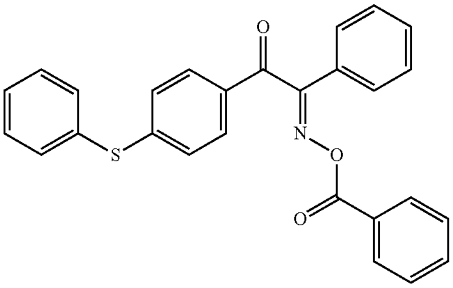
B-20
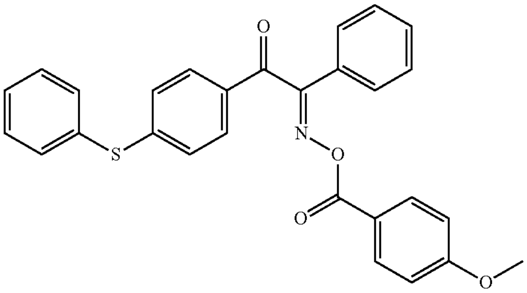

-continued
B-21
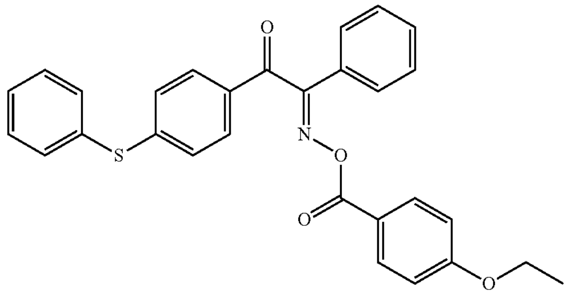
B-22
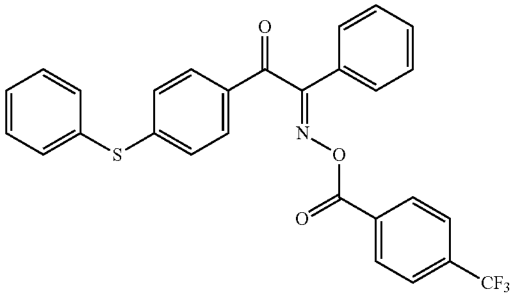
B-23
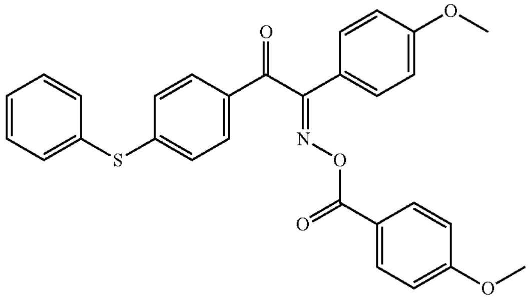
B-24
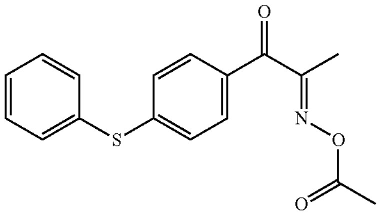
B-25
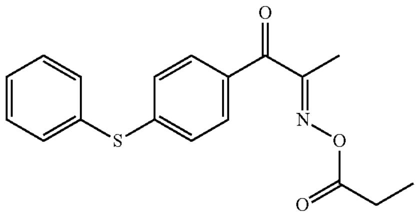
-continued
B-26
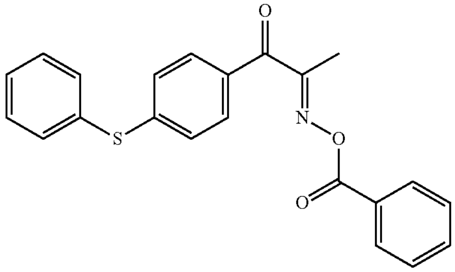
B-27
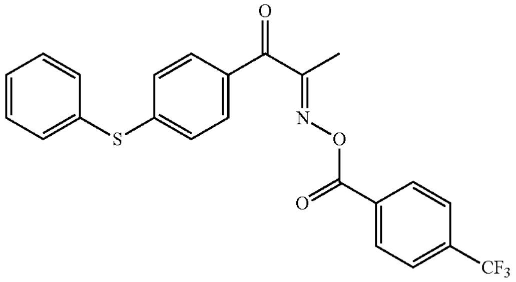
B-28
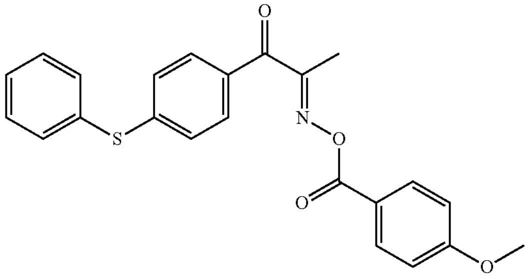
B-29
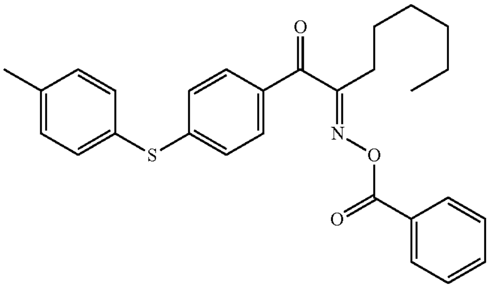
B-30
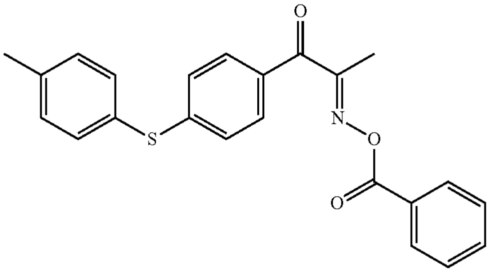

-continued

B-31

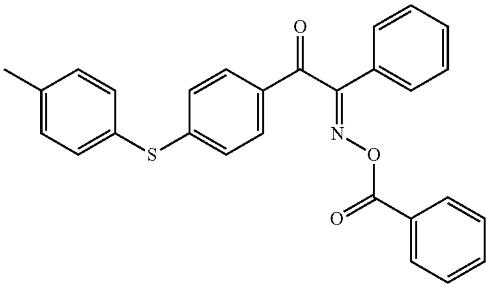

B-32

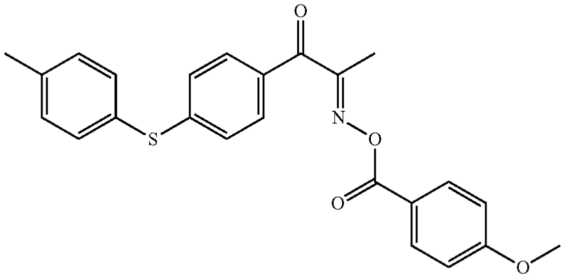

B-33

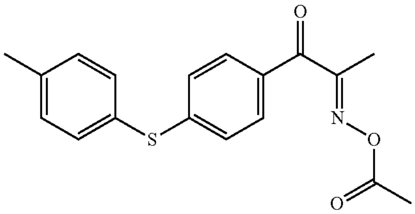

B-34

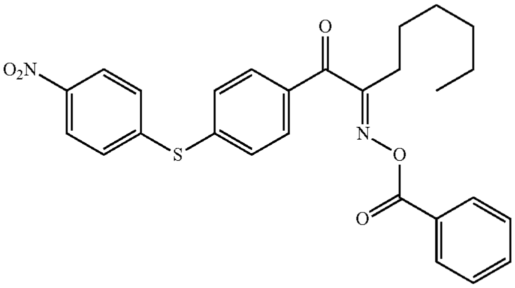

B-35

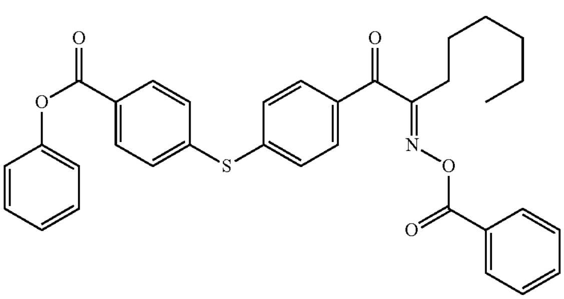

-continued

B-36

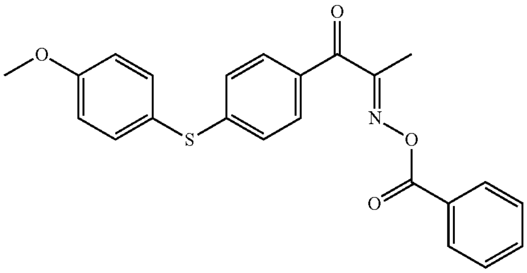

B-37

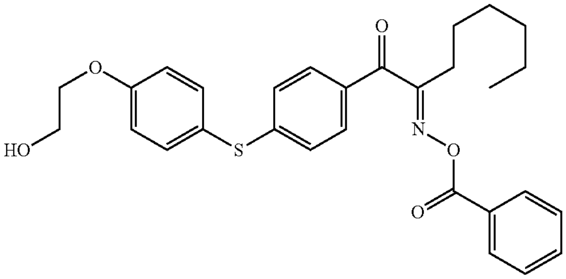

B-38

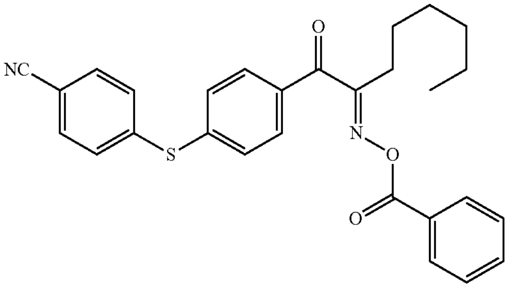

B-39

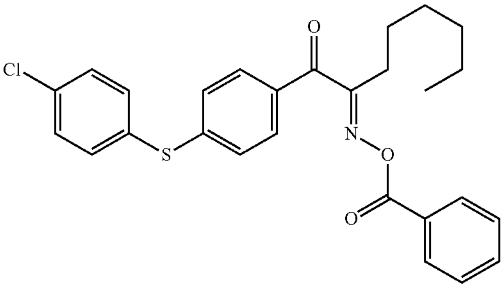

Examples of a commercially available product of the photoinitiator having an O-acyloxime structure include, for example, in addition to the above exemplified compound B-1 (Irgacure OXE01, manufactured by BASF Japan Co., Ltd.), PBG-305 or PBG-329 which is an O-acyloxime-based initiator having a disulfide structure in a compound (all of which are manufactured by Changzhou Strong Electronic New Materials Co., Ltd.).

Further, the photoinitiator used in the present invention is not limited to the above-described single molecule photoinitiator, and a bimolecule photoinitiator may be used. Examples of the bimolecule photoinitiator include a combination of a compound having a hexaarylbisimidazole structure and a thiol compound.

Specific examples of the compound having a hexaarylbisimidazole structure used as the bimolecule photoinitiator initiator are shown below.

PI-1

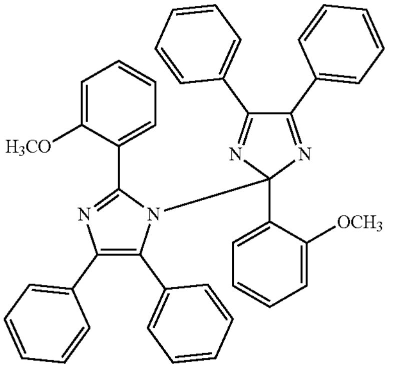

PI-2

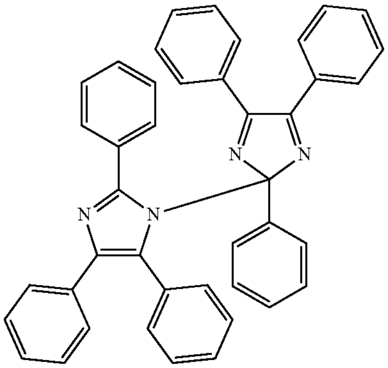

PI-3

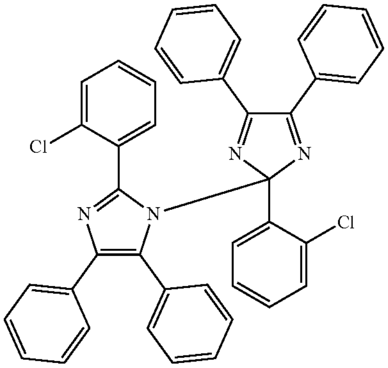

PI-4

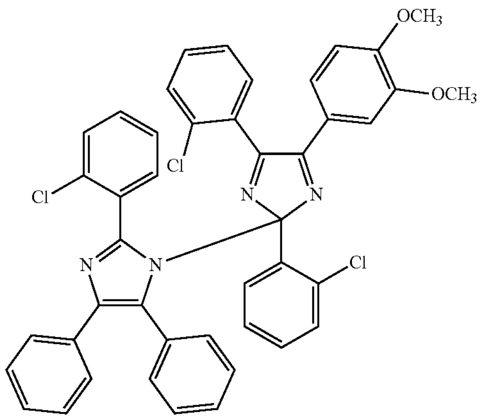

-continued

PI-5

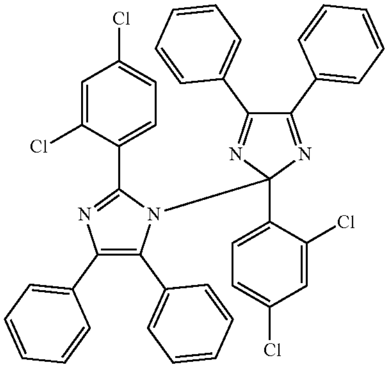

Further, specific examples of the thiol compound used as the bimolecule photoinitiator initiator are shown below.

MBO

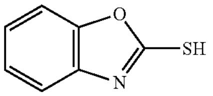

The addition ratio of the photoinitiator is preferably within a range of 0.1 to 10% by volume, and more preferably within a range of 1 to 5% by volume, when the solid content of the coating solution for forming the surface protecting layer (described later) is 100% by volume.

In addition to the photoinitiator described above, other known photoinitiators may be further contained.

(4) Inorganic Particle

The surface protecting layer according to the present invention preferably contains inorganic particles, and more preferably contains metal oxide particles as the inorganic particles.

As the metal oxide particles, metal oxide fine particles including a transition metal are preferable. Examples thereof include metal oxide particles of, for example, silica (silicon dioxide), magnesium oxide, zinc oxide, lead oxide, aluminum oxide, tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide, and vanadium oxide. In particular, any of tin oxide fine particles, titanium oxide fine particles, zinc oxide fine particles, and alumina fine particles are preferably used because the wear resistance of the surface protecting layer may be improved.

Preferably, the metal oxide particles are prepared by a generally known manufacturing method such as a gas phase method, a chlorine method, a sulfuric acid method, a plasma method, and an electrolytic method.

The number average primary particle diameter of the above metal oxide particles is preferably within a range of, for example, 1 to 300 nm, and particularly preferably within a range of 3 to 100 nm.

Further, the addition ratio of the metal oxide particles is preferably within a range of 0.1 to 30% by volume, and more preferably within a range of 1 to 20% by volume, when the solid content of the coating solution for forming the surface protecting layer (described later) is 100% by volume.

(4.1) Measuring Method of Particle Diameter of Metal Oxide Particles

A particle diameter of the metal oxide particles (number average primary particle diameter) is measured as follows. A scanning electron microscope (manufactured by JEOL Ltd.) is used to take an enlarged photograph magnified 10000 times of a sample. The photographic images of randomly selected 300 particles (aggregated particles were removed) taken by a scanner are processed using an automatic image processing analyzer "Luzex™ AP" (manufactured by Nireco Corporation) with software Ver. 1.32. The images are binarized, and the horizontal Feret diameter is calculated from each of the images. The average value is calculated as the number average primary diameter. Here, the horizontal Feret diameter refers to a length of a side parallel to an x axis of a circumscribed rectangle of a binarized metal oxide particle.

(4.2) Surface Modification

In the present invention, it is preferable that the metal oxide particles have a reactive organic group. In other words, from the viewpoint of dispersibility and wear resistance of the photoreceptor, the metal oxide particles are preferably surface-modified with a surface modifier having a reactive organic group.

As the surface modifier, a surface modifier that reacts with a hydroxy group present on the surface of the metal oxide particles before surface modification may be used, and examples of such a surface modifier include a silane coupling agent and a titanium coupling agent.

In addition, in the present invention, for the purpose of further enhancing the hardness of the surface protecting layer, a surface modifier having a reactive organic group is preferably used, and a surface modifier in which the reactive organic group is a radically polymerizable functional group is more preferably used. By using a surface modifier having a radically polymerizable functional group, a strong protective film that enables reaction with a radically polymerizable compound for a binder contained in the surface protecting layer or a charge transporting substance can be formed.

As the surface modifier having the radically polymerizable functional group, a silane coupling agent having an acryloyl group or a methacryloyl group is preferably used. Examples of the surface modifier having such a radically polymerizable functional group include known compounds as described below.

S-1: $CH_2{=}CHSi(CH_3)(OCH_3)_2$
S-2: $CH_2{=}CHSi(OCH_3)_3$
S-3: $CH_2{=}CHSiCl_3$
S-4: $CH_2{-}CHCOO(CH_2)_2Si(CH_3)(OCH_3)_2$
S-5: $CH_2{=}CHCOO(CH_2)_2Si(OCH_3)_3$
S-6: $CH_2{=}CHCOO(CH_2)_2Si(OC_2H_5)(OCH_3)_2$
S-7: $CH_2{=}CHCOO(CH_2)_3Si(OCH_3)_3$
S-8: $CH_2{=}CHCOO(CH_2)_2Si(CH_3)Cl_2$
S-9: $CH_2{=}CHCOO(CH_2)_2SiCl_3$
S-10: $CH_2{=}CHCOO(CH_2)_3Si(CH_3)Cl_2$
S-11: $CH_2{=}CHCOO(CH_2)_3SiCl_3$
S-12: $CH_2{=}C(CH_3)COO(CH_2)_2Si(CH_3)(OCH_3)_2$
S-13: $CH_2{=}C(CH_3)COO(CH_2)_2Si(OCH_3)_3$
S-14: $CH_2{=}C(CH_3)COO(CH_2)_3Si(CH_3)(OCH_3)_2$
S-15: $CH_2{=}C(CH_3)COO(CH_2)_3Si(OCH_3)_3$
S-16: $CH_2{=}C(CH_3)COO(CH_2)_2Si(CH_3)Cl_2$
S-17: $CH_2{=}C(CH_3)COO(CH_2)_2SiCl_3$
S-18: $CH_2{=}C(CH_3)COO(CH_2)_3Si(CH_3)Cl_2$
S-19: $CH_2{=}C(CH_3)COO(CH_2)_3SiCl_3$
S-20: $CH_2{=}CHSi(C_2H_5)(OCH_3)_2$
S-21: $CH_2{=}C(CH_3)Si(OCH_3)_3$
S-22: $CH_2{=}C(CH_3)Si(OC_2H_5)_3$
S-23: $CH_2{=}CHSi((CH_3)_3$
S-24: $CH_2{=}C(CH_3)Si(CH_3)(OCH_3)_2$
S-25: $CH_2{=}CHSi(CH_3)Cl_2$
S-26: $CH_2{=}CHCOOSi(OCH_3)_3$
S-27: $CH_2{=}CHCOOSi(OC_2H_5)_3$
S-28: $CH_2{=}C(CH_3)COOSi(OCH_3)_3$
S-29: $CH_2{=}C(CH_3)COOSi(OC_2H_5)_3$
S-30: $CH_2{=}C(CH_3)COO(CH_2)_3Si(OC_2H_5)_3$
S-31: $CH_2{=}CHCOO(CH_2)_2Si(CH_3)_2(OCH_3)$
S-32: $CH_2{=}CHCOO(CH_2)_2Si(CH_3)(OCOCH_3)_2$
S-33: $CH_2{=}CHCOO(CH_2)_2Si(CH_3)(ONHCH_3)_2$
S-34: $CH_2{=}CHCOO(CH_2)_2Si(CH_3)(OC_6H_5)_2$
S-35: $CH_2{=}CHCOO(CH_2)_2Si(C_{10}H_{21})(OCH_3)_2$
S-36: $CH_2{=}CHCOO(CH_2)_2Si(CH_2C_6H_5)(OCH_3)_2$

As the surface modifier, a silane compound having a reactive organic group capable of performing a radical-polymerization reaction may be used other than S-1 to S-36 described above. These surface modifiers may be used alone or in combination of 2 or more thereof.

Further, the amount of the surface modifier to be used is not particularly limited, but is preferably within a range of 0.1 to 100 parts by mass when the metal oxide particles before modification is 100 parts by mass, for example.

(4.3) Surface-Modification Method of Metal Oxide Particles

The surface-modification of the metal oxide particles can be specifically performed by wet-grinding of a slurry (a suspension of solid particles) containing metal oxide particles before modification and a surface modifier, thereby making the metal oxide particles to be fine and simultaneously proceeding the surface modification of the particles, and then removing the solvent to form a powder.

The slurry is preferably a mixture including 0.1 to 100 parts by mass of the surface modifier, and 50 to 5000 parts by mass of the solvent when the metal oxide particles before modification is 100 parts by mass.

As a device used for wet-grinding of the slurry, a wet media dispersion type device can be used.

The wet media dispersion type device is a device that performs pulverizing and dispersing the aggregated particles of the metal oxide particles when beads as a medium are filled in the container and an agitating disc attached vertically to the rotation axis is further rotated at high speed. As for the configuration, there is no problem as long as the metal oxide particles are sufficiently dispersed during surface modification and the surface can be modified. For example, various devices such as a vertical or horizontal typedevice, and a continuous or batch type device can be used. Specifically, a sand mill, an ultra visco mill, a pearl mill, a grain mill, a dyno mill, an agitator mill, or a dynamic mill can be used. These dispersing devices perform pulverization and dispersion by impact crushing, friction, shear, and shear stress using grinding media such as balls or beads.

As the beads used in the wet media dispersion type device, for example, a ball using glass, alumina, zircon, zirconia, steel, or flint stone as a raw material may be used, but particularly, those made of zirconia or zircon are preferably used. The beads to be used usually have a diameter of about 1 to 2 mm, but in the present invention, for example, those having a diameter of about 0.1 to 1.0 mm are preferably used.

The disc and the inner wall of the container used in the wet media dispersion type device may be made of various materials such as stainless steel, nylon, and ceramic, but in the present invention, it is particularly preferable that the disc and the inner wall of the container are made of zirconia or ceramic such as silicon carbide.

(5) Other Additives

Other components may be contained in the surface protecting layer according to the present invention. For example, known charge transporting substance, various kinds of antioxidants, and various kinds of lubricant particles such as fluorine atom-containing resin particles may be added.

For example, the charge transporting substances described in paragraphs [0064] to [0108], etc. of JP2018-124489A can be used as the known charge transporting substances.

The fluorine atom-containing resin particles are preferably made from one or more appropriately selected from, for example, a tetrafluoroethylene resin, a trifluoroethylene chloride resin, a hexafluoroethylene propylene chloride resin, a vinyl fluoride resin, a vinylidene fluoride resin, a difluoroethylene resin, and copolymers thereof. In particular, a tetrafluoroethylene resin and a vinylidene fluoride resin are preferred.

[1.2] Conductive Support

The support used in the photoreceptor according to the present invention may be any conductive support that is capable of supporting the photosensitive layer. For example, the support is a cylindrical or cylindrical structure.

The size of the conductive support is selected as appropriate depending on the application of the electrophotographic photoreceptor.

The material of the conductive support is not particularly limited.

Examples of the conductive support include: metal of aluminum, copper, chromium, nickel, zinc, stainless steel, and the like formed into a drum or a sheet shape; metal foil of aluminum, copper, and the like laminated on a plastic film in the form of a drum or a sheet; aluminum, indium oxide, tin oxide, and the like deposited on a plastic film in the form of a drum or a sheet; and metal, plastic, or paper in a drum or sheet shape having a conductive layer formed by applying a conductive substance alone or a composition containing a conductive substance and a binder resin.

[1.3] Photosensitive Layer

The photosensitive layer only needs to contain a charge generating substance capable of generating a charge and a charge transporting substance having a charge transporting property. For example, the photosensitive layer may include a charge generating layer including a charge generating substance and a charge transporting layer including a charge transporting substance.

The photosensitive layer, on the other hand, may contain a charge generating substance and a charge transporting substance in a single layer (a charge generating and transporting layer).

However, when the charge generating layer and the charge transporting layer are separated, the increase in residual potential can be reduced after repeated use of the electrophotographic photoreceptor, and the properties of respective layers can be easily controlled corresponding to the purpose of the electrophotographic photoreceptor.

In the examples described below, the charge generating layer and the charge transporting layer are formed separately, but the photosensitive layer of the electrophotographic photoreceptor according to the present invention is not limited to this.

(Charge Generating Layer)

The charge generating layer is a layer that can generate an electric charge by light emission, and includes, for example, a charge generating substance and a binder resin.

The charge generating substance is not particularly limited, and any known charge generating substance can be used.

Examples thereof include azo raw materials such as Sudan red and Diane blue: quinone pigments such as pyrene quinone and anthroanthrone: quinocyanine pigments; perylene pigments: indigo pigments such as indigo and thioindigo: and phthalocyanine pigments such as titanyl phthalocyanine.

The charge generating layer may contain only one or two or more of the above examples.

Known resins can also be used as the binder resin.

Examples thereof include polystyrene resin, polyethylene resin, polypropylene resin, acrylic resin, methacrylic resin, vinyl chloride resin, vinyl acetate resin, polyvinyl butyral resin, epoxy resin, polyurethane resin, phenol resin, polyester resin, alkyd resin, polycarbonate resin, silicone resin, melamine resin, polyvinylcarbazole resin, and copolymers thereof (for example, vinyl chloride-vinyl acetate copolymer resin and vinyl chloride-vinyl acetate-maleic anhydride copolymer resin).

The charge generating layer may contain only one or two or more of these binder resins.

The amount of the charge generating substance in the charge generating layer is preferably within a range of 1 to 600 parts by mass, and more preferably within a range of 50 to 500 parts by mass when the binder resin is 100 parts by mass. When the amount of the charge generating substance is within the range, a sufficient amount of electric charge can be generated.

The thickness of the charge generating layer can be selected depending on the properties of the charge generating substance, the properties of the binder resin, the mixing ratio, and other factors, but is preferably in the range of 0.01 to 5 μm, and more preferably in the range of 0.05 to 3 μm. When the thickness of the charge generating layer is within that range, the charge generating ability can be easily stabilized and the layer can be made sufficiently strong.

(Charge Transporting Layer)

The charge transporting layer is a layer that can transport the electric charge generated by the charge generating layer, and includes, for example, a charge transporting substance and a binder resin.

The charge transporting substance may be any substance that can transport an electric charge, and any known compound can be used as the charge transporting substance. Examples of the charge transporting substance include carbazole derivatives, oxazole derivatives, oxadiazole derivatives, thiazole derivatives, thiadiazole derivatives, triazole derivatives, imidazole derivatives, imidazolone derivatives, imidazolidine derivatives, bisimidazolidine derivatives, styryl compounds, hydrazone compounds, pyrazoline compounds, oxazolone derivatives, benzimidazole derivatives, quinazoline derivatives, benzofuran derivatives, acridine derivatives, phenazine derivatives, aminostilbene derivatives, triarylamine derivatives, phenylenediamine derivatives, stilbene derivatives, benzidine derivatives, poly-N-vinylcarbazole, poly-I-vinylpyrene, and poly-9-vinylanthracene.

The charge transporting layer may contain only one or two or more of the above examples.

Known resins can also be used as the binder resin.

Examples thereof include polycarbonate resin, polyacrylate resin, polyester resin, polystyrene resin, styrene-acrylonitrile copolymer resin, polymethacrylate resin, styrene-methacrylate copolymer resin, and the like. Among these, polycarbonate resin is preferred. In particular, polycarbonate resins including bisphenol A (BPA), bisphenol Z (BPZ), dimethyl BPA, and BPA-dimethyl BPA copolymer are preferred in terms of crack resistance, wear resistance, and chargeability.

The charge transporting layer may contain only one or two or more of the above examples.

The charge transporting layer may contain various additives such as antioxidants, silicone oil, and the like as long as they do not impair the purpose and effect of the present invention.

Specific examples of the antioxidant include, for example, the compounds described in JP2000-305291A.

The amount of the charge transporting substance in the charge transporting layer is preferably in the range of 10 to 50 parts by mass with respect to 100 parts by mass of the binder resin, and more preferably in the range of 20 to 100 parts by mass. When the amount of the charge transporting substance is within this range, the charge transporting layer has good charge transporting properties.

The thickness of the charge transporting layer can be selected depending on the properties of the charge transporting substance, the properties of the binder resin, the mixing ratio, and other factors, but is preferably in the range of 5 to 40 μm, and more preferably in the range of 10 to 30 μm. When the thickness of the charge transporting layer is within that range, the charge transporting ability can be easily stabilized and the layer can be made sufficiently strong.

[1.4] Other Layers

As described above, the photoreceptor may contain other layers between the conductive support and the photosensitive layer as needed, for example, the following intermediate layers.

The intermediate layer is a layer that transfers electrons generated in the charge generating layer to the side of the conductive support.

The intermediate layer may be, for example, a layer containing conductive fine particles and a binder resin.

Examples of the conductive fine particles include various metal particles; particles of metal oxides such as aluminum oxide, zinc oxide, titanium oxide, tin oxide, antimony oxide, indium oxide, and bismuth oxide; tin-doped indium oxide particles: antimony-doped tin oxide particles; zirconium oxide particles; and the like.

The intermediate layer may contain only one or two or more kinds of the conductive fine particles.

When the intermediate layer contains two or more kinds of conductive fine particles, they may be in the state of a solid solution or fused together.

The number average primary particle diameter of the conductive fine particles is preferably 0.3 μm or less, and more preferably 0.1 μm or less.

The average primary particle diameter is defined as the average of 100 primary particle diameters measured directly on an electron microscope image.

Examples of the binder resin include polyamide resin, casein, polyvinyl alcohol resin, nitrocellulose, ethylene-acrylate copolymer, vinyl chloride resin, vinyl acetate resin, polyurethane resin, gelatin, and the like.

The intermediate layer may contain only one or two or more of binder resins.

The intermediate layer preferably contains the conductive fine particles in the range of 20 to 400 parts by mass with respect to 100 parts by mass of the binder resin, and more preferably in the range of 50 to 200 parts by mass.

When the amount of the conductive fine particles is within this range, the layer has sufficient conductivity.

The thickness of the intermediate layer is preferably in the range of 0.1 to 15 μm, and more preferably in the range of 0.3 to 10 μm. When the thickness of the intermediate layer is within this range, the layer can be made sufficiently strong.

[1.5] Manufacturing Method of Electrophotographic Photoreceptor

The method of manufacturing the electrophotographic photoreceptor described above includes preparing the conductive support, forming a photosensitive layer on the conductive support (photosensitive layer forming step), and forming a surface protecting layer on the photosensitive layer (surface protecting layer forming step).

The step of forming an intermediate layer on the conductive support (intermediate layer forming step) may be performed before forming the photosensitive layer.

Hereinafter, the intermediate layer forming step, the photosensitive layer forming step, and the surface protecting layer forming step will be described, but the method of manufacturing the electrophotographic photoreceptor of the present invention is not limited to such methods.

(Intermediate Layer Forming Step)

In the intermediate layer forming step, the conductive support described above is prepared, and the intermediate layer described above is formed on the conductive support.

The above intermediate layer can be formed as a result of coating and solidifying an intermediate layer composition containing the above conductive fine particles, the above binder resin, and a solvent.

Examples of the solvent contained in the intermediate layer composition preferably include alcohols having 1 to 4 carbon atoms such as methanol, ethanol, n-propyl alcohol, isopropyl alcohol, n-butanol, t-butanol, and sec-butanol from the viewpoint of the ease of application of the intermediate layer composition and the like. The intermediate layer composition may further contain benzyl alcohol, toluene, cyclohexanone, tetrahydrofuran, and the like from the viewpoint of improving the preservability of the intermediate layer composition and dispersibility of the conductive fine particles.

The method of preparing the intermediate layer composition is not particularly limited.

For example, the solvent and the binder resin may be mixed first, and the conductive particles may be added to the mixture later.

Dispersion of the conductive fine particles may be performed using an ultrasonic dispersion machine, a ball mill, a sand grinder, a homo mixer, or the like.

The method of applying the intermediate layer composition is not particularly limited and may be a dip coating method, a spray coating method, a spinner coating method, a bead coating method, a blade coating method, a beam coating method, a circular volume-regulated coating method, or the like.

Drying methods of the intermediate layer composition can be appropriately selected depending on the kind of solvent and the thickness of the layer to be formed, and thermal drying is particularly preferred.

(Photosensitive Layer Forming Step)

In the photosensitive layer forming step, a photosensitive layer is formed on the conductive support or on the above intermediate layer.

The method of forming the photosensitive layer is appropriately selected depending on the layer composition of the photosensitive layer.

For example, when the photosensitive layer consists of only one layer of the charge generating and transporting layer, the charge generating and transporting layer composition containing the charge generating substance, the charge transporting substance, the binder resin, and a solvent is prepared, applied to the intermediate layer, and solidified to form the photosensitive layer.

On the other hand, when the photosensitive layer consists of two layers, the charge generating layer and the charge transporting layer, the layers are each formed one after the other in the following manner.

<Formation of Charge Generating Layer>

The method of forming the charge generating layer is not particularly limited, and can be formed as a result of applying and solidifying a charge generating layer composition containing the above charge generating substance, the above binder resin, and a solvent on the above conductive support (or on the intermediate layer if the intermediate layer formation step is performed).

Examples of the solvent used in the charge generating layer composition include toluene, xylene, methyethyl ketone, cyclohexane, ethyl acetate, butyl acetate, methanol, ethanol, propanol, butanol, methyl cellosolve, ethyl cellosolve, tetrahydrofuran, 1-dioxane, 1,3-dioxolane, pyridine, and diethylamine. The charge generating layer composition may contain only one or two or more of these.

The charge generating layer composition may be prepared by any method as long as the charge generating substance, the binder resin, and the solvent can be sufficiently mixed.

For example, the binder resin and the solvent may be mixed, and then the charge generating substance may be added to the mixture.

In the preparation of the charge generating layer composition, a dispersing device such as an ultrasonic dispersion machine, a ball mill, a sand grinder, a homo mixer, or the like can be used.

The charge generating layer composition can be applied by any known method with no particular limitations.

Examples of the method of applying the charge generating layer composition include a dip coating method, a spray coating method, a spinner coating method, a bead coating method, a blade coating method, a beam coating method, a circular volume-regulated coating method, and the like.

The charge generating layer composition is solidified by any method without particular limitation, for example, as a result of removing the solvent through heating, or as a result of spontaneous drying.

<Formation of Charge Transporting Layer>

The method of forming the above charge transporting layer is also not particularly limited, and can be formed as a result of applying and solidifying a charge transporting layer composition containing the above charge transporting substance, the above binder resin, and a solvent.

Examples of the solvent include toluene, xylene, methyethyl ketone, cyclohexanone, ethyl acetate, butyl acetate, methanol, ethanol, propanol, butanol, tetrahydrofuran, 1,4-dioxane, 1,3-dioxolane, and the like. The charge transporting layer composition may contain only one or two or more of these.

The method of mixing the charge transporting substance, the binder resin, and the solvent is not particularly limited.

They can be mixed by any known stirring device, or the like.

The charge transporting layer composition can be applied by any known method with no particular limitations.

Examples of the method of applying the charge transporting layer composition include a dip coating method, a spray coating method, a spinner coating method, a bead coating method, a blade coating method, a beam coating method, a circular volume-regulated coating method, and the like. The charge transporting layer composition is solidified by any method without particular limitation, for example, as a result of removing the solvent through heating, or as a result of spontaneous drying.

(Surface Protecting Layer Forming Step)

The surface protecting layer is formed as a result of irradiating a coating solution with ultraviolet light and curing it. The coating solution contains at least the polyfunctional polymerizable compound having the above-mentioned hole transporting property or not having the above-mentioned hole transporting property and the photoinitiator and, if necessary, further contains the monofunctional polymerizable compound having the above hole transporting property, a known charge transporting substance, inorganic particles, and the like.

Specifically, for example, the coating solution (hereafter also referred to as a "coating solution for forming surface protecting layer") is prepared as a result of adding the polyfunctional polymerizable compound having hole transporting property, the polyfunctional polymerizable compound not having hole transporting property, photoinitiator, and, if necessary, inorganic particles and other components to a known solvent. Then, this coating solution for forming the surface protecting layer is applied to the outer surface of the above charge transporting layer to form a coating layer, which is then dried and irradiated with ultraviolet rays so that the above polyfunctional polymerizable compound and the like in the coating layer is cured to form the surface protecting layer.

The curing process of the surface protecting layer preferably includes polymerization reaction of the above-mentioned polyfunctional polymerizable compound and the like in response to generation of radicals as a result of irradiation of the coating layer with ultraviolet rays, and formation of crosslinking bonds between and within molecules by crosslinking reactions such that the polyfunctional polymerizable compound is formed as a cross-linked curable resin.

Preparation of the coating solution for forming the protecting layer includes dissolving or dispersing each of the above components in a solvent. Among the above components, surface-modified metal oxide particles are dispersed in the solvent and used. Means for dispersing the inorganic particles and charge transporting substance in the coating solution for forming the surface protecting layer include, but are not limited to, an ultrasonic dispersion machine, a ball mill, a sand mill, a homo mixer, and the like.

Any solvent can be used to form the surface protecting layer as long as the polyfunctional polymerizable compound having or not having hole transporting property, the photoinitiator, the monofunctional polymerizable compound having hole transporting property, the charge transporting substance, the inorganic particles, and the like can be dissolved or dispersed in the solvent. The solvent may be, but not limited to, methanol, ethanol, n-propyl alcohol, isopropyl alcohol, n-butanol, t-butanol, sec-butanol, benzyl alcohol, toluene, xylene, dichloromethane, methyethyl ketone, cyclohexane, ethyl acetate, butyl acetate, methyl cellosolve, ethyl cellosolve, tetrahydrofuran, 1,4-dioxane, 1,3-dioxolane, pyridine, diethylamine, and the like.

The method of applying the coating solution for forming the protecting layer include, for example, a dip coating method, a spray coating method, a spinner coating method, a bead coating method, a blade coating method, a beam coating method, a slide hopper method, a circular slide hopper method, or the like. When manufacturing a drum-shaped photoreceptor, the coating solution for forming the protective layer is preferably applied to the surface to be coated by the circular slide hopper method.

Application by the circular slide hopper method can be performed using a circular slide hopper application device. In the application using the circular slide hopper application device, the coating solution is supplied to the slide surface of the device and flows in a band shape from the end of the slide surface to the surface to be coated.

In the application method using the circular slide hopper application device, the end of the slide surface and the surface to be coated are positioned with a certain gap between them, so that the application can be performed without damaging the surface to be coated. The circular slide hopper method is preferred as an application method of the second and subsequent layers when forming multiple layers having different properties and dissolving in the same solvent, for example, in forming a laminate containing the intermediate layer, the charge generating layer, the charge transporting layer, and the protecting layer in manufacture of a photoreceptor. This is because, in the circular slide hopper method, the surface to be coated is in the solvent for a much shorter time than in the dip coating method, so the lower layer components hardly elute to the upper layer side and the coating tank during application.

The applied layer may be cured without drying, but is preferably cured after spontaneous or thermal drying.

Drying conditions can be appropriately selected depending on the kind of the solvent, layer thickness, and other factors. The temperature for drying is preferably in the range of room temperature (25° C.) to 180° C., and particularly preferably in the range of 80 to 140° C. The duration of drying time is preferably from 1 to 200 minutes, and particularly preferably from 5 to 100 minutes.

Any ultraviolet light source can be used without limitation as long as it is a light source that emits ultraviolet rays. For example, a low pressure mercury lamp, a medium pressure mercury lamp, a high pressure mercury lamp, a very high pressure mercury lamp, a carbon arc lamp, a metal halide lamp, a xenon lamp, a flash (pulse) xenon, and the like can be used.

Light emitting conditions are different for each lamp, but for example, the amount of ultraviolet emission is usually in the range of 5 to 500 $mJ/cm^2$, preferably in the range of 5 to 100 $mJ/cm^2$. The lamp power is preferably in the range of 0.1 to 5 kW, and particularly preferably in the range of 0.5 to 3 kW. The required UV radiation is preferably obtained, for example, in an irradiation time of 0.1 seconds to 10 minutes, and more preferably 0.1 seconds to 5 minutes from the viewpoint of work efficiency.

In the surface protecting layer forming step, drying can be performed before, after, and during UV irradiation. The timing of drying can be selected from these and combined as appropriate.

[2] Cleaning Blade (2.1) Definition of Terms Related to Cleaning Blade

The definitions of respective terms are explained with reference to FIG. 3.

<Contacting Load>

The contacting load is the force applied to the surface of the photoreceptor 10 when the cleaning blade CL is brought into contact with the contacting portion C on the surface of the photoreceptor 10 and is loaded.

<Effective Contact Angle>

The effective contact angle $\theta_1$ of the present invention is the angle formed by a rubber material and a ridge line of the image carrier at the downstream side of the contacting portion in the rotating direction when the rubber material is crimped with the image carrier and bent. As shown in FIG. 3, the effective contact angle $\theta_1$ is the actual angle $\theta_1$ formed by the tip of the cleaning blade CL and the surface of the photoreceptor 10.

The cleaning blade CL according to the present invention is characterized in that the effective contact angle $\theta_1$ is in the range of 8 to 20°.

The effective contact angle θ1 can be obtained as a result of calculating the bending using the cross-sectional shape of the cleaning blade CL and the physical properties of the material, such as Young's modulus.

<Rigid Contact Angle>

The rigid contact angle is a design value used when the cleaning blade CL is brought into contact with the surface of the photoreceptor.

Figure 3:
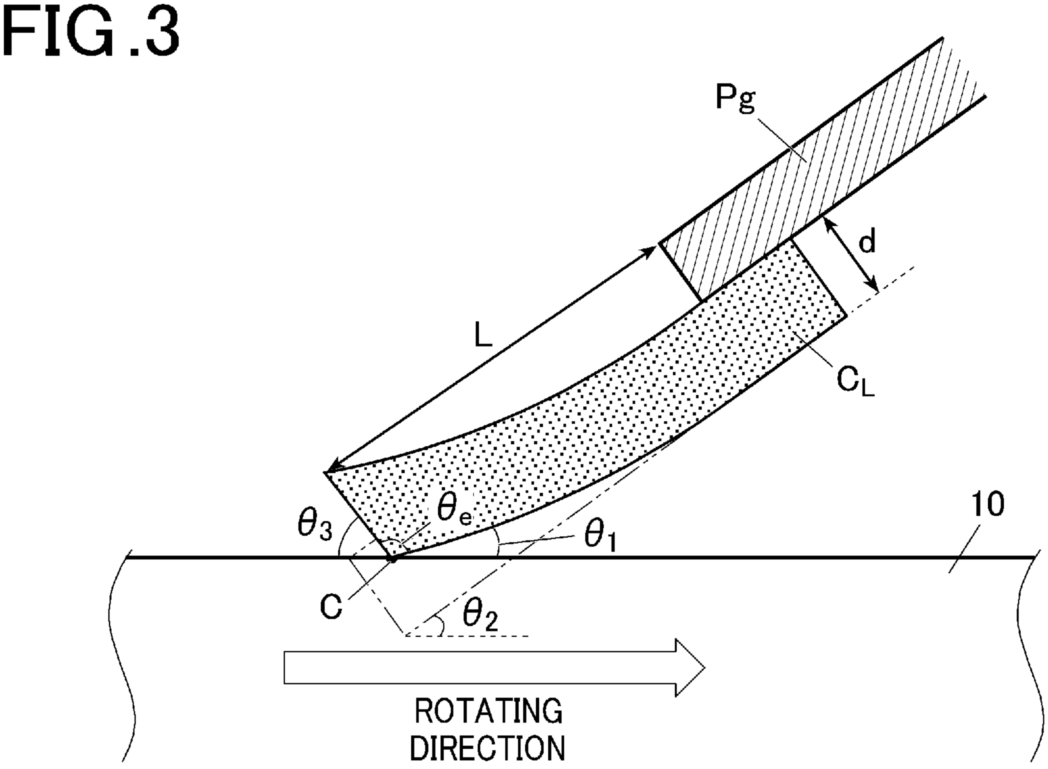
FIG. 3 is a conceptual diagram of a side view showing a relationship between the cleaning blade and the electrophotographic photoreceptor according to the present invention.

The angle $\theta_2$ shown in FIG. 3 is the rigid contact angle formed by the tip of the cleaning blade CL and the surface of the photoreceptor 10, assuming that the cleaning blade CL is a rigid body (shown by the dotted line).

<Edge Angle>

The edge angle is the angle $\theta_e$ shown in FIG. 3 at the tip ridge portion of the rubber material, which is the contacting portion C in contact with the photoreceptor surface. The edge angle $\theta_e$ according to the present invention is characterized by an obtuse angle but less than 120°.

<Free Length>

The free length according to the present invention is the length of the portion of the rubber material protruding from the plate metal Pg, excluding the portion bonded to the plate metal Pg as shown in FIG. 3.

<Upstream Wedge Angle>

The upstream wedge angle is the angle formed by a rubber material and a ridge line of the photoreceptor 10 at the upstream side of the contacting portion in the rotating direction.

(2.2) Outline of Cleaning Blade

The electrophotographic image forming system of the present invention removes toner for electrostatic charge image development by pressing the tip ridge of the cleaning blade against the surface of the photoreceptor.

The cleaning blade has an obtuse shape with an edge angle $\theta_e$ of 120' or less, and its tip ridge is pressed against the surface of the photoreceptor. The effective contact angle $\theta_1$ of the cleaning blade is within the range of 8 to 200.

FIG. 3 is a conceptual diagram showing the cleaning blade according to the present invention and the electrophotographic photoreceptor from the side.

As shown in FIG. 3, the above cleaning blade is positioned so that its tip ridge is in contact with the surface of the photoreceptor 10 with the edge angle $\theta_e$ and the effective contact angle $\theta_1$ are within the respective ranges described above. The portion of the tip ridge that is in contact with the surface of the photoreceptor 10 is defined as the contacting portion C.

When the effective contact angle $\theta_1$ is 8° or more, the wedge space is secured between the photoreceptor and the cleaning blade at the downstream side of the cleaning blade edge in the rotating direction. As a result, the deposition of aggregates on the blade edge is suppressed even when the aggregates reach the cleaning blade.

The effective contact angle $\theta_1$ of the cleaning blade CL according to the present invention is 8° or more, but it is more preferably 9° or more from the viewpoint of effect expression.

However, a too large effective contact angle $\theta_1$ leads to a large amount of the blade edge to be pulled in, which may cause cleaning defects due to blade flipping and increased stick-slip vibration.

The effective contact angle $\theta_1$ of the cleaning blade according to the present invention is 20° or less, but is more preferably 17° or less from the viewpoint of effect expression.

In the present invention, the edge angle $\theta_e$ of the cleaning blade is an obtuse angle, which results in a smaller amount of the edge of the cleaning blade itself to be pulled in. Therefore, the effective contact angle $\theta_1$ can be larger than that in the case where the edge of the cleaning blade is not in an obtuse shape.

However, when the above edge angle $\theta_e$ is too large, the surface pressure at the blade edge is small and allows the external additive to easily slip through the blade. As a result, even when the effective contact angle $\theta_1$ is sufficient, the additive may easily accumulate on the blade edge.

The edge angle $\theta_e$ of the cleaning blade according to the present invention is an obtuse angle of 120° or less, but an angle of 95° or more and 110° or less is even more preferable from the viewpoint of effect expression.

(2.3) Configuration of Cleaning Blade

The cleaning blade CL according to the present invention is mainly composed of rubber material.

All the rubber material portions do not have to be made of the same material. The blade may be a two-layer blade consisting of a contact layer that forms the edge portion and a support layer, for example.

When the cleaning blade CL has a two-layer configuration, for example, a material having a lower permanent strain than the material of a contacting layer may be used as the material of the support layer in order to prevent the layer from losing tension.

<Material>

The material of the cleaning blade CL according to the present invention is preferably urethane rubber from the viewpoints of wear resistance and molding processing.

<Hardness>

The rubber hardness of the cleaning blade CL according to the present invention is preferably in the range of 65° to 85° in terms of the hardness value specified in JIS-A.

When the rubber hardness is 65° or more, the blade is less likely to be pulled in, the upstream wedge angle $\theta_3$ is not too small, and the effective contact angle $\theta_1$ can be set reasonably large. Therefore, the accumulation of additives on the blade edge is suppressed.

When the rubber hardness is 85° or less, the rubber portion is flexible and moderately bites into the photoreceptor when in contact with it. Therefore, even when vibration is generated during driving, surface pressure distribution fluctuations in the longitudinal direction will be relatively small. As a result, the accumulation of the external additive on the blade edge can be more effectively suppressed.

<Rebound Resilience>

The rebound resilience of the cleaning blade CL according to the present invention is preferably in the range of 10° to 40°.

When the rebound resilience is within the above range, vibration is moderately suppressed, and the external additive is less likely to slip through the blade.

<Shape>

The free length L of the cleaning blade CL according to the present invention is preferably in the range of 7.0 to 12.5 mm, and its thickness is preferably in the range of 1.7 to 2.5 mm.

Further, the ratio of the free length L to the thickness d (l/d) is preferably 3.5 or more. As mentioned above, the surface pressure at the tip of the cleaning blade is not completely uniform in the longitudinal direction. Due to minute vibrations of the blade tip that occur during driving, the tip of the cleaning blade has portions where the surface pressure is locally large and portions where the surface pressure is locally small. Especially in the portions where the surface pressure is locally small, the external additive tends to slip through the nip of the cleaning blade, and aggregates of the external additive are likely to occur at the edge.

When the ratio of the free length L to the thickness d is 3.5 or more, the blade rubber portion bends and bites into the photoreceptor when in contact with the photoreceptor. Therefore, even when vibration is generated during driving, surface pressure distribution fluctuations in the longitudinal direction will be relatively small. This can more effectively suppress the occurrence of aggregates of the external additive. From the viewpoint of enhancing the effect of the present invention, the ratio of the free length L to the thickness d is preferably 4.5 or more, and particularly preferably 5.0 or more. The upper limit of the ratio of the free length L to the thickness d is preferably 6.0. When the ratio of free length L to thickness d is larger than 6.0, the tip of the cleaning blade is likely to be pulled in largely so as to flip over.

As long as the ratio of the free length L to the thickness d (lid) is within the above ranges, it is considered that the effect of suppressing thread-like adhesion can be achieved no matter what the absolute values of the respective dimensions are. However, considering the variation in component dimensions and the need to design the unit into a compact size, the free length is practically in the range of 7.0 mm to 12.5 mm, and the thickness is practically in the range of 1.5 mm to 2.5 mm.

<Contacting Conditions>

The contacting load of the cleaning blade CL according to the present invention is preferably in the range of 9 to 30 N/m from the viewpoint of preventing unwiped portion from remaining and preventing flipping.

When the contacting load is 9 N/m or more, no unwiped portion remains. When the contacting load is 30 N/m or less, the edge is not easily flipped.

(Configuration)

As described above, all the rubber material portions do not have to be made of the same material, and the blade may be a two-layer blade consisting of a contact layer that forms the edge portion and a support layer, for example. When the cleaning blade CL has a two-layer configuration, for example, a material having a lower permanent strain than the material of a contacting layer may be used as the material of the support layer in order to reduce the endurance fluctuation of contacting load.

[3] Electrostatic Charge Image Developing Toner

The electrostatic charge image developing toner (also referred to simply as "toner") used in the image forming system of the present invention includes toner particles having toner matrix particles and an external additive that is attached to the surface of the toner matrix particles.

As the external additive, it is particularly preferred that at least a fatty acid metal salt, which is a lubricant, be contained on the surface of the toner particles, and that the amount of the fatty acid metal salt to be added is 0.15% by mass or more with respect to the toner matrix particles. This is because, when the surface of the photoreceptor is coated with the fatty acid metal salt so as to be hydrophobic, the generation of aggregates can be more effectively suppressed even in the presence of unreacted groups.

In the present specification, "toner matrix particles" refers to particles that constitute the matrix of "toner particles."

The "toner matrix particles" include at least a binding resin, and may further contain other components such as a colorant, a releasing agent (wax), a charge controlling agent, and the like, as needed.

In general, particles formed by adding and adhering the external additive to the surface of "toner matrix particles" are referred to as the "toner particles."

However, when the toner matrix particles themselves are used as they are without the addition of the external additive for adhesion, the toner matrix particles themselves may be referred to as the "toner particles." The term "toner" refers to an assembly of the "toner particles."

(3.1) Toner Matrix Particles

Known toner matrix particles can be used as the toner matrix particles according to the present invention.

Such toner matrix particles specifically include at least a binding resin and, if necessary, a colorant.

The toner matrix particles can also include other components such as a releasing agent and a charge controlling agent, if necessary.

(3.2) Binding Resin

Known binding resins can be used as the binding resin according to the present invention. For example, amorphous resins and crystalline resins can be suitably used.

In particular, the binding resin preferably includes styrene acrylic resin and crystalline polyester resin, as described below.

(3.2.1) Amorphous Resin

Amorphous resins that can be used in the present invention are not particularly limited. In addition to the following vinyl resins and polyester resins, known amorphous resins such as urethane resins and urea resins can be preferably used.

<Vinyl Resins>

Vinyl resins used as the amorphous resin are not limited as long as they are polymerized vinyl compounds. Examples thereof include acrylic ester resins, styrene-acrylic ester resins, and ethylene-vinyl acetate resins.

They may be used alone or in combination of two or more of these.

Among the above vinyl resins, a styrene-acrylic ester resin (styrene acrylic resin) is preferred for its plasticity during heat fixation.

Therefore, although detailed descriptions are omitted, examples of preferably used styrene monomers include styrene, o-methylstyrene, m-methylstyrene, p-methylstyrene, α-methylstyrene, p-phenylstyrene, and p-ethylstyrene. Examples of preferably used (meth)acrylic ester monomers include acrylic ester monomers such as methyl acrylate, ethyl acrylate, isopropyl acrylate, n-butyl acrylate, isobutyl acrylate, and methacrylic ester monomers such as methyl methacrylate, ethyl methacrylate, n-butyl methacrylate, isopropyl methacrylate, and isobutyl methacrylate. These styrene monomers and the (meth)acrylic ester monomers can be used alone or in combination of two or more kinds thereof.

Other monomers may also be polymerized, such as acrylic acid, methacrylic acid, maleic acid, itaconic acid, silicic acid, fumaric acid, maleic acid monoalkyl esters, itaconic acid monoalkyl esters, 2-hydroxyethyl(meth)acrylate, 2-hydroxypropyl(meth)acrylate, 3-hydroxypropyl (meth)acrylate, 2-hydroxybutyl(meth)acrylate, 3-hydroxybutyl(meth)acrylate, 4-hydroxybutyl(meth)acrylate, and polyethylene glycol mono(meth)acrylate.

Styrene acrylic resin can be manufactured by emulsion polymerization or other methods without any particular limitations.

<Polyester Resin>

Polyester resins can be used as the amorphous resins. An amorphous polyester resin is a resin for which no clear endothermic peak is obtained in the results of differential scanning calorimetry (DSC) among the known polyester resins obtained by polycondensation reaction of a divalent or more carboxylic acid (polycarboxylic acid) with a divalent or more alcohol (polyalcohol).

A clear endothermic peak is, specifically, an endothermic peak with a half width (full width half maximum) of 15° C. or less at a temperature raising rate of 10° C./min in differential scanning calorimetry (DSC).

Examples of polyvalent carboxylic acids include: aliphatic dicarboxylic acids such as Oxalic acid, malonic acid, succinic acid, glutaric acid, adipic acid, pimelic acid, suberic acid, azelic acid, sebacic acid, 1,9-nonandicarboxylic acid, 1, 10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; aromatic dicarboxylic acids such as phthalic acid, isophthalic acid, terephthalic acid, and naphthalenedicarboxylic acid; aliphatic unsaturated dicarboxylic acids such as maleic acid, fumaric acid, itaconic acid, citraconic acid, glutaconic acid, isododecenyl succinic acid, n-dodecenyl succinic acid, and n-octenyl succinic acid; and divalent or more carboxylic acids such as trimellitic acid, pyromellitic acid, naphthalene tetracarboxylic acid, naphthalene tetracarboxylic acid, pyrene tricarboxylic acid, and pyrene tetracarboxylic acid.

Examples of Polyhydric alcohols include: aliphatic diols such as ethylene glycol, 1,3-propanediol, 1,4-butanediol, 1,5-pentanediol, 1,6-hexanediol, 1,7 heptanediol, 1,8-octanediol, 1,9-nonanediol, 1,10-dodecanediol, 1,11-undecanediol, 1,12-dodecanediol, 1,13-tridecanediol, 1,14-tetradecanediol, 1,18-octadecanediol, and 1,20-eicosanediol 1,20-eicosanediol: bisphenols such as bisphenol A and bisphenol F and their alkylene oxide adducts such as their ethylene oxide adducts and propylene oxide adducts; and polyols of trivalent or more, such as glycerin, pentaerythritol, hexamethylol melamine, hexaethylol melamine, tetramethylolbenzoguanamine, and tetraethylolbenzoguanamine.

(3.2.2) Crystalline Resin

The toner matrix particles according to the present invention may include crystalline resins. For example, in addition to the crystalline polyesters listed below, and the crystalline resins listed in paragraphs 0043 to 0102, etc. of JP-2015-011325A can be preferably used.

In particular, a hybrid crystalline polyester resin is preferably included for manufacturing.

<Crystalline Polyester Resin>

The crystalline polyester resin is the portion derived from known polyester resins obtained by polycondensation reaction of a divalent or more carboxylic acid (polyvalent carboxylic acid) with a divalent or more alcohol (polyhydric alcohol). The crystalline polyester resin is a resin unit for which a clear endothermic peak is obtained in the results of differential scanning calorimetry (DSC) rather than a staircase-like endothermic change.

A clear endothermic peak is, specifically, an endothermic peak with a half width (full width half maximum) of 15° C.

or less at a temperature raising rate of 10° C./min in differential scanning calorimetry (DSC) described in the Examples.

The crystalline polyester resins are not particularly limited as long as meeting the above definition.

For example, it may consist only of crystalline polyester resin.

Alternatively, it may be a hybrid resin having a crystalline polyester resin unit as long as a toner containing the resin shows a clear endothermic peak as described above. Examples of such a hybrid resin include a resin having a structure of a main chain of a crystalline polyester resin unit and other component(s) copolymerized thereto, a resin having a structure of a crystalline polyester resin unit copolymerized to a main chain of a component that is not the crystalline polyester resin unit, and the like.

The crystalline polyester resin is synthesized from a polyvalent carboxylic acid component and a polyvalent alcohol component. The carbon number of the polyvalent carboxylic acid component is C(acid), and the carbon number of the polyhydric alcohol component is C(alcohol). The valence of the polyvalent carboxylic acid component and the polyvalent alcohol component is each preferably 2 to 3, and particularly preferably 2.

The method of forming crystalline polyester resin is not particularly limited. The resin can be formed using polycondensation (esterification) of the above polyvalent carboxylic acids and polyvalent alcohols with a known esterification catalyst.

The above polyalcohol component and the polycarboxylic acid component are preferably used in such a ratio that the equivalent ratio ([OH]/[COOH]) of the hydroxy group [OH] of the diol component to the carboxy group [COOH] of the dicarboxylic acid component is 1.5/1 to 1/1.5, more preferably 1.2/1 to 1/1.2.

Examples of catalysts that can be used in the manufacture of the crystalline polyester resin include alkali metal compounds including sodium and lithium: alkaline earth metal compounds including magnesium and calcium; metal compounds including aluminum, zinc, manganese, antimony, titanium, tin, zirconium, germanium; phosphite compounds; phosphoric acid compounds; and amine compounds.

Specifically, examples of tin compounds include dibutyltin oxide, tin octylate, tin dioctylate, and salts of these compounds.

Examples of titanium compounds include: titanium alkoxides such as tetranormal butyl titanate, tetraisopropyl titanate, tetramethyl titanate, and tetrastearyl titanate; titanium acylates such as polyhydroxytitanium stearate; and titanium chelates such as titanium tetraacetylacetonate, titanium lactate, and titanium triethanolaminate.

Examples of germanium compounds include germanium dioxide.

Examples of aluminum compounds include oxides such as polyaluminum hydroxide and aluminum alkoxides such as tributylaluminate. They may be used alone or in combination of two or more of these.

There is no particular limitation on the polymerization temperature or polymerization time, and the reaction system may be depressurized as necessary during polymerization.

When the hybrid resin includes crystalline polyester resin units, the content of the crystalline polyester resin units is preferably in the range of 50 to 98% by mass with respect to the total amount of the hybrid resin.

The hybrid resin has sufficient crystallinity when the content is in the above range. The constituents and content ratio of each unit in the hybrid resin can be determined, for example, by NMR measurement or methylation reaction P-GC/MS measurement.

Here, the hybrid resin includes, in addition to the crystalline polyester resin units described above, amorphous resin units other than polyester resin, which are detailed below.

The hybrid resin can be any of block copolymers, graft copolymers, and the like, as long as they contain the above crystalline polyester resin units and amorphous resin units other than polyester resin, but is preferably a graft copolymer.

When the hybrid resin is a graft copolymer, the orientation of the crystalline polyester resin units can be easily controlled, and the crystallinity of the hybrid resin can be enhanced.

Furthermore, from the above viewpoint, grafted crystalline polyester resin units are preferred, having amorphous resin units other than a crystalline polyester resin as the main chain.

In other words, the hybrid crystalline polyester resin is preferably a graft copolymer having an amorphous resin unit other than a polyester resin as the main chain and a crystalline polyester resin unit as the side chain.

When the hybrid crystalline polyester resin is the above graft copolymer, the crystalline polyester resin units are highly oriented and the crystallinity of the hybrid resin can be enhanced.

A substituent group may be further introduced into the hybrid resin, such as a sulfonic acid group, a carboxy group, and a urethane group. The substituent may be introduced in the crystalline polyester resin unit or in the amorphous resin unit other than a polyester resin, which will be detailed below.

<Amorphous Resin Unit Other than Polyester Resin>

The amorphous resin unit other than polyester resin is a portion derived from an amorphous resin other than the crystalline polyester resin described above.

The presence of amorphous resin units in the hybrid resin (and, furthermore, in the toner) and their chemical structure can be determined by selecting an appropriate method for analysis of the structure among the NMR measurement, P-GCMS measurement, methylation reaction P-GCMS measurement, and the like.

Results of differential scanning calorimetry (DSC) for a resin having the same chemical structure and molecular weight as the amorphous resin unit show no melting point and a relatively high first glass transition temperature (Tg).

Amorphous resin units are not particularly limited as long as they meet the above definition.

When a toner has an amorphous resin unit as described above, the resin included in the toner is classified as the hybrid resin having the amorphous resin unit, for example, a resin having a structure of a main chain of an amorphous resin unit and other component(s) copolymerized thereto, a resin having a structure of an amorphous resin unit copolymerized to a main chain of a component that is not the amorphous resin unit, and the like.

The amorphous resin unit is preferably a resin of the same kind as the amorphous resin contained in the binding resin (that is, the resin other than the hybrid resin).

This improves the affinity between the hybrid resin and the amorphous resin, makes it further easier for the hybrid resin to be incorporated into the amorphous resin, and further improves charge uniformity and the like.

Here, the resin(s) of the same kind commonly contain a characteristic chemical bond in the repeating units.

The "characteristic chemical bond" is in accordance with the "Polymer classification" described in "NIMS Materials Database" (http://polymer.nims.go.jp/PoLylnfo/guide/en/term polymer.html) by National Institute for Materials Science.

In other words, the "characteristic chemical bond" refers to the chemical bond that constitutes the following 22 kinds of polymers: polyacrylics; polyamides; polyanhydrides; polycarbonates; polydienes; polyesters; polyhalo-olefins; polyimides; polyimines; polyketones: polyolefins: polyoxides: polyphenylenes: polyphosphazenes: polysiloxanes: polystyrenes; polysulfides: polysulfones; polyurethanes; polyureas: polyvinyls; and other polymers.

When the resins are copolymers whose constituent units are multiple monomer species having the above chemical bonds, the resins of the same kind refer to resins that have common characteristic chemical bonds in the chemical structure of the multiple monomer species constituting the copolymer.

Therefore, resins having a characteristic chemical bond in common are considered to be resins of the same kind even when the properties of the resins themselves are different from each other or the molar component ratios of the monomer species constituting the copolymer are different from each other.

For example, a resin (or a resin unit) formed of styrene, butyl acrylate, and acrylic acid and a resin (or a resin unit) formed of styrene, butyl acrylate, and methacrylic acid are resins of the same kind because they have at least the chemical bond that forms a polyacrylate.

For further example, a resin (or a resin unit) formed of styrene, butyl acrylate, and acrylic acid and a resin (or a resin unit) formed of styrene, butyl acrylate, acrylic acid, terephthalic acid, and fumaric acid have at least a chemical bond that forms a polyacrylic as a chemical bond common to each other.

Thus, these are the resins of the same kind.

Resin components of the amorphous resin unit are not particularly limited, but include, for example, a vinyl resin unit, a urethane resin unit, a urea resin unit, and the like.

Among these, the vinyl resin unit is preferred because of its easily controllable thermoplasticity.

The vinyl resin unit is not particularly limited as long as the vinyl compound is polymerized, and examples thereof include an acrylic ester resin unit, a styrene-acrylic ester resin unit, an ethylene-vinyl acetate resin unit, and the like.

They may be used alone or in combination of two or more of these.

The method of forming the styrene acrylic resin unit is not particularly limited and includes polymerization of monomers using known oil-soluble or water-soluble polymerization initiators.

Specific examples of oil-soluble polymerization initiators are the azo or diazo polymerization initiators and peroxide polymerization initiators listed below.

Examples of the azo or diazo polymerization initiators include 2,2'-azobis-(2,4-dimethylvaleronitrile), 2,2'-azobisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide polymerization initiators include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxy cyclohexyl)propane, tris-(t-butyl peroxy) triazine, and the like.

When resin particles are formed by emulsion polymerization, water-soluble radical polymerization initiators can be used. Examples of the water-soluble radical polymerization initiators include persulfates such as potassium persulfate and ammonium persulfate, azobis aminodipropane acetate, azobiscyanovaleric acid and its salts, and hydrogen peroxide.

The content of the amorphous resin unit is preferably in the range of 3 to 50% by mass with respect to the total amount of the hybrid resin. Furthermore, the above content is more preferably within the range of 5 to 30% by mass. When the content is within these ranges, the hybrid resin has sufficient crystallinity.

<Method of Manufacturing Hybrid Crystalline Polyester Resin (Hybrid Resin)>

The method of manufacturing the hybrid resin included in the binding resin according to the present invention is not particularly limited as long as it is possible to form a polymer having the structure of the above crystalline polyester resin unit and the amorphous resin unit molecularly bonded together.

Examples of specific method of manufacturing the hybrid resins include the following methods.

(1) Method of Manufacturing the Hybrid Resin Including a Polymerization Reaction to Form a Crystalline Polyester Resin Unit in the Presence of an Amorphous Resin Unit that has been Polymerized in Advance In this method, first, the amorphous resin unit is formed by addition reaction of the monomers constituting the amorphous resin unit described above (preferably, a styrene monomer and a vinyl monomer such as a (meth)acrylic ester monomer).

Next, in the presence of the amorphous resin unit, the crystalline polyester resin unit is formed by polymerization reaction of a polyvalent carboxylic acid and a polyalcohol.

At this time, the hybrid resin is formed by condensation reaction of the polyvalent carboxylic acid and polyalcohol, together with addition reaction of the polyvalent carboxylic acid or polyalcohol to the amorphous resin unit.

In the above method, in the crystalline polyester resin unit or the amorphous resin unit, a moiety that allows these units to react with each other is preferably incorporated.

Specifically, for example, the amorphous resin unit is formed using, in addition to the monomer that constitutes the amorphous resin unit, a compound having a moiety that can react with the carboxy group [—COOH] or a hydroxy group [—OH] remaining in the crystalline polyester resin unit and a moiety that can react with the amorphous resin unit.

In other words, the compound reacts with the carboxy group [—COOH] or the hydroxy group [—OH] in the crystalline polyester resin unit, so that the crystalline polyester resin unit can be chemically bonded to the amorphous resin unit.

Alternatively, the crystalline polyester resin unit may be formed using a compound having a moiety that can react with the polyalcohol or polycarboxylic acid, as well as the amorphous resin unit.

The above method can be used to form the hybrid resin having a structure (graft structure) in which the crystalline polyester resin unit is molecularly bonded to the amorphous resin unit.

(2) Method of Manufacturing the Hybrid Resin Including Bonding a Crystalline Polyester Resin Unit and an Amorphous Resin Unit Each Formed in Advance to Each Other In this method, first, a crystalline polyester resin unit is formed by condensation reaction of a polyvalent carboxylic acid and a polyalcohol.

Further, apart from the formation of the crystalline polyester resin unit, the amorphous resin unit is formed by addition polymerization of the monomer that constitutes the amorphous resin unit described above.

At this time, a moiety that allows the crystalline polyester resin unit and the amorphous resin unit to react with each other is preferably incorporated.

Because the method of incorporating the moiety enabling such reactions is described above, the details of that method is omitted.

Next, by reaction of the crystalline polyester unit formed above with the amorphous resin unit, a hybrid resin having a structure in which the crystalline polyester resin unit and the amorphous resin unit are molecularly bonded can be formed.

When the moiety enabling above reactions is not incorporated in the crystalline polyester resin unit or the amorphous resin unit, a compound having a moiety capable of binding to the crystalline polyester resin unit and the amorphous resin unit may be added to the system formed in advance, in which the crystalline polyester resin unit and the amorphous resin unit coexist.

Then, a hybrid resin having a structure in which the crystalline polyester resin unit and the amorphous resin unit are molecularly bonded to each other via the compound to form can be formed.

(3) Method of Manufacturing the Hybrid Resin Including a Polymerization Reaction to Form an Amorphous Resin Unit in the Presence of a Crystalline Polyester Resin Unit that has been Formed in Advance In this method, first, condensation reaction of a polyvalent carboxylic acid and a polyalcohol is performed to form a crystalline polyester resin unit by polymerization.

Next, in the presence of the crystalline polyester resin unit, the crystalline polyester resin unit is formed by polymerization reaction of monomers constituting the amorphous resin unit.

At this time, in the crystalline polyester resin unit or the amorphous resin unit, a moiety that allows these units to react with each other is preferably incorporated in the same manner as in (1) above.

Because the method of incorporating the moiety enabling such reactions is described above, the details of that method is omitted.

The above method can be used to form the hybrid resin having a structure (graft structure) in which the amorphous resin unit is molecularly bonded to the crystalline polyester resin unit.

Among the above methods (1) to (3), the method (1) is preferred because, according to the method (1), it is easy to form the hybrid resin having a structure in which the crystalline polyester resin chain is grafted to the amorphous resin chain, and the manufacturing process can be simplified.

According to the method (1), since the crystalline polyester resin unit is bonded after the amorphous resin unit is formed in advance, the orientation of the crystalline polyester resin unit is likely to be uniform. The method (1) is therefore preferred because it can reliably form the hybrid resin suitable for the toner regarding the present invention.

(3.3) Colorant

Examples of the colorant that can constitute the toner matrix particles include carbon blacks, magnetic materials, dyes, pigments, and the like. As the carbon blacks, channel black, furnace black, acetylene black, thermal black, lamp black, and the like are used.

Examples of the magnetic materials that can be used include ferromagnetic metals such as iron, nickel and cobalt, alloys containing these metals, ferromagnetic metal compounds such as ferrite and magnetite, alloys that do not contain a ferromagnetic metal but has a ferromagnetic property when heated, so-called Hausler alloys such as manganese-copper-aluminum and manganese-coper-tin, chromium dioxide, and the like.

Examples of magenta or red colorant include C. I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 48:3, C.I. Pigment Red 53:1, C.I. Pigment Red 57:1, C.I. Pigment Red 60, C.I. Pigment Red 63, C.I. Pigment Red 64, C.I. Pigment Red 68, C.I. Pigment Red 81, C.I. Pigment Red 81:4, C.I. Pigment Red 83, C.I. Pigment Red 87, C.I. Pigment Red 88, C.I. Pigment Red 89, C.I. Pigment Red 90, C.I. Pigment Red 112, C.I. Pigment Red 114, C.I. Pigment Red 122, C.I. Pigment Red 123, C.I. Pigment Red 139, C.I. Pigment Red 144, C.I. Pigment Red 149, C.I. Pigment Red 150, C.I. Pigment Red 163, C.I. Pigment Red 166, C.I. Pigment Red 170, C.I. Pigment Red 177, C.I. Pigment Red 178, C.I. Pigment Red 184, C.I. Pigment Red 202, C.I. Pigment Red 206, C.I. Pigment Red 207, C.I. Pigment Red 209, C.I. Pigment Red 222, C.I. Pigment Red 238, C.I. Pigment Red 269, and the like.

Examples of orange or yellow colorant include C. I. Pigment Orange 31, C. I. Pigment Orange 43, C. I. Pigment Yellow 12. C. I. Pigment Yellow 14, C. I. Pigment Yellow 15, C. I. Pigment Yellow 17, C. I. Pigment Yellow 74, C. I. Pigment Yellow 83, C. I. Pigment Yellow 93, C. I. Pigment Yellow 94, C. I. Pigment Yellow 138, C. I. Pigment Yellow 139, C. I. Pigment Yellow 155, C. I. Pigment Yellow 162, C. I. Pigment Yellow 180, C. I. Pigment Yellow 185, Solvent Yellow 93, and the like.

Examples of green or cyan colorant include C. I. Pigment Blue 2, C. I. Pigment Blue 3, C. I. Pigment Blue 15, C. I. Pigment Blue 15:2, C. I. Pigment Blue 15:3, C. I. Pigment Blue 15:4, C. I. Pigment Blue 16. C. I. Pigment Blue 17. C. I. Pigment Blue 60, C. I. Pigment Blue 62, C. I. Pigment Blue 66, C. I. Pigment Green 7, and the like.

These colorants can be used alone or in combination as needed.

The amount of the colorant to be added is preferably in the range of 1 to 30% by mass, more preferably in the range of 2 to 20% by mass with respect to the total of the toner matrix particles. Mixtures of the colorants can also be used.

When the content is in this range, the color can be adequately reproduced in the image.

The dispersion diameter (volume average particle diameter) of the colorant in the toner is preferably in the range of 10 to 1000 nm, even more preferably in the range of 50 to 500 nm, and particularly preferably in the range of 80 to 300 nm.

(3.4) Releasing Agent

The releasing agent constituting the toner matrix particles is not particularly limited, and any known releasing agent can be used.

Examples of the releasing agent include: polyolefin waxes such as polyethylene wax and polypropylene wax; branched-chain hydrocarbon waxes such as microcrystalline wax; long-chain hydrocarbon waxes such as paraffin wax and sasol wax; dialkyl ketone waxes such as distearyl ketone: ester waxes such as carnauba wax, montan wax, behenic acid behenate, trimethylolpropane tribehenate, pentacrythritol tetrabehenate, pentaerythritol diacetate dibehenate, glycerin tribehenate, 1,18-octadecanediol distearate, tristearyl trimellitate, and distearyl maleate; and amide waxes such as ethylenediamine behenylamide and tristearylamide trimellitate.

The melting temperature of the releasing agent is preferably in the range of 40 to 160° C., more preferably in the range of 50 to 120° C.

When the melting temperature is within the above ranges, the heat resistance preservation of the toner is ensured. Furthermore, cold offsets, etc. do not occur even when fixing is performed at a low temperature, and toner images can be formed stably.

The amount of the releasing agent in the toner matrix particles is preferably in the range of 1 to 30% by mass, more preferably in the range of 5 to 20% by mass.

(3.5) Charge Controlling Agent

A charge controlling agent can be added to the toner matrix particles according to the present invention as needed.

Various known charge controlling agents can be used.

Examples of the charge controlling agent include various known compounds that can be dispersed in aqueous media, specifically, nigrosine dyes, metal salts of naphthenic acid or higher fatty acids, Alkoxylated amines, Quaternary ammonium salt compounds, azo metal complexes, salicylic acid metal salts or metal complexes thereof.

The amount of the charge controlling agent is preferably in the range of 0.1 to 10% by mass, more preferably in the range of 0.5 to 5% by mass with respect to the total amount of the binding resin.

(3.6) External Additive

The toner particles of the electrostatic charge image developing toner according to the present invention preferably include at least a fatty acid metal salt as the external additive.

In addition, from the viewpoint of improving the charging property, flowing property, or cleaning property as the toner, particles such as known inorganic and organic fine particles and lubricant particles can be added to the surface of the toner matrix particles as the external additive.

The amount of the fatty acid metal salt to be added is preferably in the range of 0.15 to 0.30% by mass with respect to the toner matrix particles from the viewpoint of sufficiently improving surface lubricity.

When the amount of the fatty acid metal salt to be added is in the range of 0.15 to 0.30% by mass with respect to the toner matrix particles, the surface lubricity can be sufficiently improved, and the problem of small coverage of fatty acid metal salts despite sufficient ductility is eliminated.

The fatty acid metal salt is preferably zinc stearate because it improves the surface lubricity. When zinc stearate is used, the lubricity of the surface can be further improved because the appropriate spaces between layered crystals, which is determined by the alkyl chain length, improve cleaving property and ductility, and thus further improves the lubricity of the surface.

The smaller the particle diameter of the fatty acid metal salt, the more uniformly it can be applied and the better the lubricity of the surface.

From the above viewpoint, the particle diameter is preferably 4 μm or less, and more preferably 2 μm or less. The fatty acid metal salt having a small particle diameter as described above can be applied uniformly and can improve the lubricity of the surface.

Along with the fatty acid metal salt having a small particle diameter, fatty acid metal salt having a large diameter of 10 μm or more may be used.

The overall supply of fatty acid metal salt to the photoreceptor can be increased when the fatty acid metal salt having a larger particle diameter, which easily drops off from the toner matrix particles, is used.

Examples of the preferred inorganic particles include inorganic particles made of silica, titania, alumina, strontium titanate, and the like.

In particular, from the viewpoint of stress resistance, silica particles having a large diameter, with a number average primary particle diameter in the range of about 80 to 500 nm, are preferably included.

If necessary, these inorganic particles may be hydrophobized.

The organic particles that can be used are spherical organic particles having a number-average primary particle diameter in the range of about 10 to 2000 nm.

Specifically, organic fine particles based on a monopolymer(s) of styrene, methyl methacrylate, and the like and a copolymer(s) of these polymers can be used.

A lubricant is used to further improve cleaning property and transfer property, particularly to obtain the effect of the present invention. Examples of the lubricant include metal salts of a higher fatty acid such as: zinc, aluminum, copper, magnesium, calcium, and other salts of stearic acid; zinc, manganese, iron, copper, magnesium, and other salts of oleic acid; zinc, copper, magnesium, calcium, and other salts of palmitic acid; zinc, calcium and other salts of linoleic acid; and zinc, calcium, and other salts of ricinoleic acid.

The addition amount of the external additive is preferably in the range of 0.1 to 10.0% by mass with respect to 100% by mass of the toner matrix particles.

[4] Image Forming Apparatus

The image forming apparatus used in the electrophotographic image forming system is preferably an image forming apparatus based on the generally used electrophotographic method, and includes at least an electrophotographic photoreceptor, charging means, an exposure means, a developing means, a transfer means, a fixing means, and a cleaning means.

In particular, a tandem type image forming device is preferably used.

Figure 4:
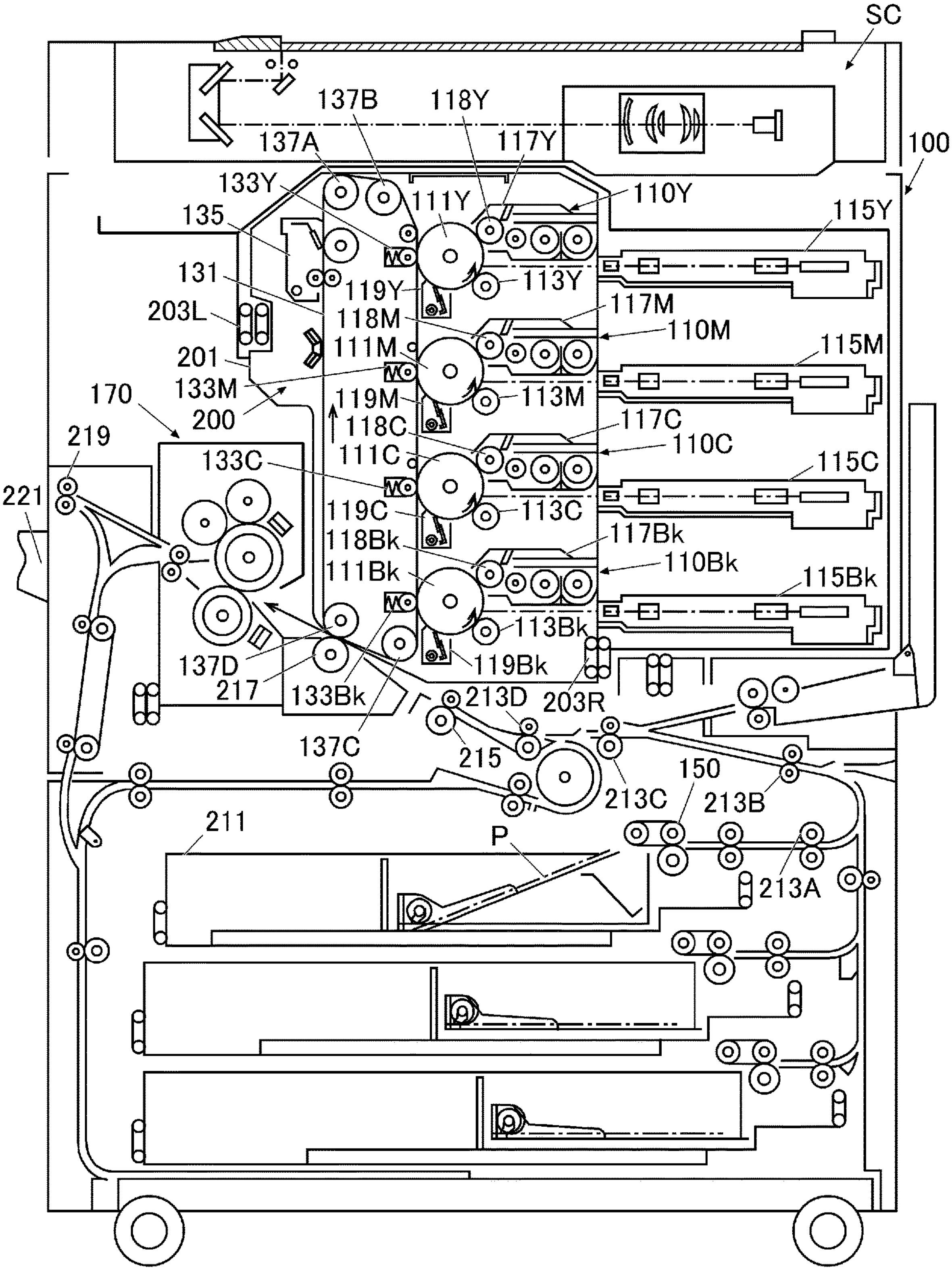
FIG. 4 is a cross-sectional view that illustrates an example of a configuration of an image forming apparatus according to the present invention.
Figure 5:
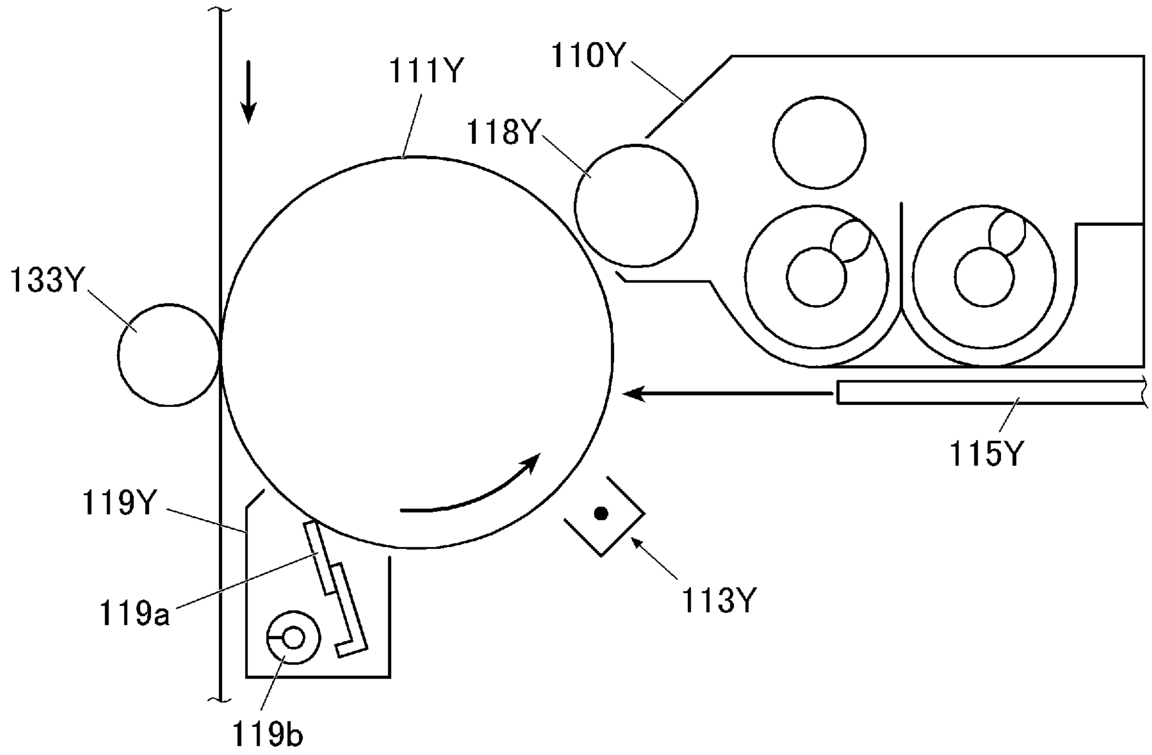
FIG. 5 is a cross-sectional view that illustrates an example of a configuration of a key part of the image forming apparatus.

FIG. 4 is a cross-sectional view for illustrating an example of a configuration of the image forming apparatus, and FIG. 5 is a cross-sectional view for illustrating an example of a configuration of a key part of the image forming apparatus.

The image forming apparatus 100 shown in FIG. 4 is called a tandem-type color image forming apparatus and includes four image forming units 110Y, 110M, 110C, and 110Bk, a sheet conveyance means 150, and a fixing means 170.

A document image scanner SC is located at the top of the main body of the image forming apparatus 100.

The image forming units 110Y, 110M, 110C, and 110Bk are arranged vertically in line.

The image forming units 110Y, 110M, 110C, and 110Bk include: rotating drum-shaped photoreceptors 111Y, 111M, 111C, and 111Bk. Along the outer circumference of the photoreceptors 111Y, 111M, 111C, and 111Bk in the direction of rotation, the followings are arranged in sequence: a lubricant supply means; respective charging means 113Y, 113M, 113C, and 113Bk; respective exposure means 115Y, 115M, 115C, and 115Bk; respective developing means 117Y, 117M, 117C, and 117Bk; respective primary transfer rollers (primary transfer means) 133Y, 133M, 133C, and 133Bk; respective cleaning means 119Y, 119M, 119C, 119Bk; and a lubricant removing means. The developing means 117Y, 117M, 117C and 117Bk include developing roller 118Y, 118M, 118C, and 118Bk, respectively.

Then, yellow (Y), magenta (M), cyan (C), and black (Bk) toner images are formed on the photoreceptors 111Y, 111M, 111C, and 111Bk, respectively.

The image forming units 110Y, 110M, 110C, and 110Bk differ in the color of the toner images formed on the photoreceptors 111Y, 111M, 111C, and 111Bk, but are the same in other respects. Therefore, in the following, imaging unit 110Y will be explained as an example.

In the following, the electrophotographic photoreceptor, the charging means, the exposure means, the developing means, the transfer means, the fixing means, and the cleaning means are described in this order.

(4.1) Charging Means

As shown in FIG. 4, the charging means 113Y is a means that charges the surface of the photoreceptor 111Y by means of a charging roller.

The charging means 113Y in this example includes a charging roller arranged in contact with the surface of the photoreceptor 111Y and a power supply that applies voltage to the charging roller.

The charging means of the present invention is a charging means of a proximity charging type that charges the surface of the photoreceptor with the charging roller in contact with or in close proximity to the surface of the photoreceptor.

When the power supply applies a charging bias voltage to the core metal of the above charging roller 113Y, the surface of photoreceptor 111Y is charged to a predetermined potential of a predetermined polarity.

The charging bias voltage may be, for example, a DC voltage only, but is preferably an oscillating voltage in which an AC voltage is superimposed on the DC voltage, as this improves uniformity of charging.

The charging bias voltage is, for example, in the range of −2.5 to −1.5 kV.

According to an example of charging conditions by the charging roller 113Y shown in FIG. 4, a charging bias voltage formed from a DC voltage of −500 V and an AC voltage of a sine wave having a frequency of 1000 Hz and a peak-to-peak voltage of 1300 V is applied, thereby the surface of the photoreceptor is uniformly charged to −500 V.

(5.2) Exposure Means

As shown in FIG. 4, the exposure means 115Y exposes the surface of the photoreceptor 111Y, to which the charging means 113Y has applied a uniform potential, based on the image signal (yellow image signal), and forms an electrostatic latent image corresponding to a yellow image.

The exposure means 115Y may include LEDs and an imaging element(s) with light-emitting elements arrayed in an axial direction of the photoreceptor 111Y, or may be a laser optical system.

(5.3) Developing Means

As shown in FIG. 4, the developing means (developer) 117Y supplies the toner to the surface of the photoreceptor 111Y and develops the electrostatic latent image formed on the surface of the photoreceptor 111Y to form a toner image.

The developing means 117Y of this example specifically includes a developing roller 118Y and a voltage applying device (not shown). The developer roller 118Y has a built-in magnet that holds the developing agent and rotates. The voltage application device applies a DC and/or AC bias voltage between the photoreceptor lilY and this developing roller 118Y.

The developing means 117Y is preferably located at the most downstream position in the rotational direction of the photoreceptor, because toner filling is likely to occur at the most downstream position.

The toner is conveyed to photoreceptor 111Y upon rotation of developing roller 118Y.

Then, a thin layer of the toner on the developing roller 118Y contacts the photoreceptor 111Y and the electrostatic latent image on the photoreceptor 111Y is developed.

The developing roller 118Y is connected to a voltage application device.

This voltage application device then applies a DC and/or AC bias voltage to the developing roller 118Y.

When the voltage applied to the developing roller 118Y is controlled, the developing potential (also referred to as developing bias) (Vdc) is configured to be adjusted to a desired value.

Electric field is formed at the developing portion where the developing roller 118Y and the photoreceptor 111Y are facing each other due to the difference (developing potential difference) between the potential of the developing roller 118Y and the potential of the electrostatic latent image carried by the photoreceptor 111.

The toner in the developing agent conveyed to the developing portion due to rotation of the developing roller 118Y moves due to the force from the electric field and is adsorbed onto the electrostatic latent image on the photoreceptor 111Y. As a result of the development of the electrostatic latent image carried on the photoreceptor 111Y, a toner image corresponding to the shape of the electrostatic latent image is formed on the surface of the photoreceptor 111Y.

Here, the electrostatic latent image on the photoreceptor includes a non-image area and an image area.

The non-image area is the portion of the surface of photoreceptor 111Y that is uniformly charged by the charging roller 113Y. The potential of this non-image area is referred to as a non-image area potential (VO).

The image area is the portion of the surface of photoreceptor 111Y that is a part of the non-image area whose potential has decreased due to exposure by the exposure means, for example. The potential of this image area is referred to as an image area potential (Vi).

The developing potential (Vdc) is set to a value between the non-image area potential (VO) and the image area potential (Vi).

An electric field formed at the non-image area is in the direction that moves the toner from the photoreceptor toward the developing means.

In the present invention, the developing conditions of the developing machine are set to one of the following (i) to (iii) under normal temperature and humidity environment of 23° C. and 50% RH, compared to low temperature and humidity environment of 10° C. and 20% RH.

(i) The AC duty ratio (the ratio of the time (T(−)) during which the potential is on the negative side to the AC cycle T) of the developing potential applied to the developing roller of the developer is lowered.

(ii) In a two-component developing agent, the concentration of the two-component developing toner is lowered.

(iii) The cover-up margin ((non-image area potential VO of photoreceptor)—(developing potential Vdc)) is increased.

Thus, for example, in the case of condition (i), the voltage applying device of the developing means applies superimposed AC and DC voltages to the developing rollers in such a way as to reduce the AC duty ratio.

In the case of condition (iii), the final absolute value of the potential Vc applied to the core of the charging roller is set to be higher.

In the case of condition (ii), the two-component developing agent including a low concentration of toner is used.

(5.4) Transfer Means

As shown in FIG. 4, the primary transfer roller 133Y, which constitutes the transfer means, transfers the toner image formed on the photoreceptor 111Y to the intermediate transfer body 131, which is in the form of an endless belt.

The primary transfer roller 133Y is disposed in contact with the intermediate transfer body 131.

In the intermediate transfer method used in this image forming apparatus 100, the primary transfer rollers (primary transfer means) 133Y, 133M, 133C, and 133Bk respectively transfer the toner images formed on the photoreceptors 111Y, 111M, 111C, and 111Bk to the intermediate transfer body 131. Then, each of the toner images transferred onto the intermediate transfer body 131 is transferred onto the transfer media P by the secondary transfer roller (secondary transfer means) 217. However, a direct transfer method may be used in which the toner image formed on the photoreceptor is directly transferred to the transfer medium by the transfer means.

(5.5) Cleaning Means

As shown in FIG. 4, the cleaning means 119Y is a means that removes the toner remaining on the surface of photoreceptor 111Y.

The cleaning means 119Y in this example consists of a cleaning blade, a collecting screw, and a housing.

The details of the cleaning blade used in the above cleaning means are as described above, but will be explained here in conjunction with FIG. 5.

The toner remaining on the photoreceptor 111Y that has not been transferred onto the intermediate transfer body 131 is conveyed to the cleaning means 119Y, scraped off by the cleaning blade 119*a*, and collected by the collecting screw 119*b*. The collecting screw 119*b* rotates in one direction and conveys the toner that has been scraped off by the cleaning blade 119*a* and fallen to a waste toner box, which is not shown in the drawing.

The cleaning blade is positioned so that its edge is oriented in a counter direction that is opposite to the rotating direction of the photoreceptor 111Y at the point where the edge and the surface of the photoreceptor IllY is contacting.

As shown in FIG. 4, the intermediate transfer body 131 is wound around and rotatably supported by a plurality of rollers 137A, 137B, 137C, and 137D.

On the intermediate transfer body 131, the cleaning means 135 that removes the toner remaining on the intermediate transfer body is located.

In this image forming apparatus 100, the photoreceptor 111Y, the developing means 117Y, the cleaning means 119Y, and the like may be a process cartridge (image forming unit) that is integrally combined and detachable from the apparatus body.

Alternatively, the photoreceptor 111Y may be integrally configured with one or more members selected from the group consisting of the charging means 113Y, the exposure means 115Y, the developing means 117Y, the primary transfer roller 133Y, and the cleaning means 119Y to form a process cartridge (image forming unit).

The process cartridge 200 includes a housing 201 and the photoreceptor 111Y, the charging means 113Y, the developing means 117Y, the cleaning means 119Y, and the primary transfer roller 133Y housed in the housing 201.

The main body of the apparatus also contains support rails 203L and 203R as a means to guide the process cartridge 200 into the main body of the apparatus.

This allows the process cartridge 200 to be attached to and detached from the main body of the apparatus.

This process cartridge 200 can be a single image forming unit that can be freely attached to and detached from the main body of the apparatus.

The sheet conveyance means 150 is provided so that the transfer medium P in a sheet feeding cassette 211 can be conveyed to the secondary transfer roller 217 via a plurality of intermediate rollers 213A, 213B, 213C, and 213D and a resist roller 215.

The fixing means 170 fixes the color image transferred by the secondary transfer roller 217. A sheet exit roller 219 sandwiches the transfer medium P that has been subjected to the fixing process and can place it on a sheet exit tray 221.

In the image forming apparatus 100 configured in this way, the image forming units 110Y, 110M, 110C, and 110Bk form toner images. Specifically, the charging means 113Y, 113M, 113C, and 113Bk first discharge the surfaces of the photoreceptors 111Y, 111M, 111C, and 111Bk to negatively charge them.

Next, the exposure means 115Y, 115M, 115C, and 115Bk expose the surfaces of the photoreceptors 111Y, 111M, 111C, and 111Bk to light based on the image signal to form electrostatic latent images.

Next, the developing means 117Y. 117M, 117C, and 117Bk apply the toner to the surfaces of the photoreceptors 111Y, 111M, 111C, and 111Bk for development to form toner images.

Next, the primary transfer rollers (primary transfer means) 133Y, 133M, 133C, and 133Bk are brought into contact with the rotating intermediate transfer body 131.

Thereby, the toner images of respective colors formed on the photoreceptors 111Y, 111M, 111C, and 111Bk are successively transferred onto the rotating intermediate transfer body 131, and the color image is transferred (primary transfer).

During the entire image forming process, the primary transfer roller 133Bk is in contact with the photoreceptor 111Bk.

Meanwhile, the other primary transfer rollers 133Y, 133M, and 133C are in contact with the corresponding photoreceptors 111Y, 111M, and 111C, respectively, only during color image formation.

After the primary transfer rollers 133Y, 133M, 133C, and 133Bk are detached from the intermediate transcriber 131, the toner remaining on the surface of the photoreceptors 111Y, 111M, 111C, and 111Bk is removed by the cleaning means 119Y, 119M, 119C, and 119Bk.

Next, when necessary, the surfaces of the photoreceptors 111Y, 111M, 111C, and 111Bk are electrically neutralized by static eliminating means (not shown in the drawing) and then negatively charged by the charging means 113Y, 113M, 113C, and 113BK.

Meanwhile, the transfer medium P (a support to which the final image is attached, such as a sheet of plain paper or a transparency sheet, for example) stored in the sheet feeding cassette 211 is fed by the sheet conveyance means 150 and then conveyed to the secondary transfer roller (secondary transfer means) 217 via the plurality of intermediate rollers 213A, 213B, 213C, 213D, and the resist roller 215.

The secondary transfer roller 217 is then brought into contact with the rotating intermediate transfer roller 131 to transfer the color images collectively on the transfer medium P (secondary transfer).

The secondary transfer roller 217 contacts the intermediate transfer body 131 only when performing the secondary transfer on the transfer medium P. Thereafter, the transfer material P on which the color images are collectively transferred is separated from the intermediate transcriber 131 at a portion having a high curvature.

The transfer medium P on which the color images have been collectively transferred in this manner is fixed by the fusing means 170, sandwiched by the sheet exit roller 219, and placed on the sheet exit tray 221 outside the apparatus.

After the transfer medium P onto which the color images have been transferred collectively is separated from the intermediate transfer medium 131, the cleaning means 135 removes the toner remaining on the intermediate transcriber 131.

EXAMPLES

Hereinafter, specific Examples (Inv. 1 to 20) of the present invention are described together with Comparative Examples (Comp. 1 to 7), but the present invention is not limited to these examples. In the examples, "part" and "%" mean "part by mass" and "% by mass" unless otherwise specified.

[Production of Electrophotographic Image Forming System: Hereinafter also Referred to as "System" in TABLES.]

[Production of Electrophotographic Photoreceptor (Hereinafter also Referred to as "Photoreceptor") 1]

Electrophotographic Photoreceptor 1 was produced as follows.

<Preparation of Conductive Support>

The surface of a cylindrical aluminum support having a diameter of 30 mm was machined, and a conductive support having a surface roughness Rz of 1.5 (μm) was prepared.

<Formation of Intermediate Layer>

The following components were dispersed for 10 hours in a batch process using a sand mill to obtain a dispersion liquid.

(Composition)

Binder resin: Polyamide resin CM8000 (manufactured by Toray Industries. Inc.) 1 part by mass Conductive fine particles: Titanium dioxide SMT500SAS (manufactured by TAYCA Co., Ltd.) 3 parts by mass Methanol 10 Parts by Mass After that, the above dispersion liquid was diluted twice with methanol and left to stand overnight.

The dispersion liquid after standing was filtered through a filter (Ridgemesh (registered trademark) 5 μm filter, manufactured by Pall Corporation) and used as the intermediate layer composition.

The intermediate layer composition was applied to the above conductive support by the dip application method and solidified.

The dry layer thickness of the intermediate layer was 2 μm.

<Formation of Charge Generating Layer>

The following components were mixed and dispersed for 10 hours using a sand mill to obtain a charge generating layer composition.

(Composition)

Charge generating substance: Titanyl phthalocyanine pigment (Titanyl phthalocyanine pigment having a maximum diffraction peak at least at 27.3° as measured by Cu-Kα characteristic X-ray diffraction spectrum measurement) 20 parts by mass Binder resin: Polyvinyl butyral resin (#6000-C, manufactured by Denka Company Limited) 10 parts by mass t-butyl acetate 700 parts by mass 4-methoxy-4-methyl-2-pentanone 300 parts by mass The above charge generating layer composition was applied to the above intermediate layer by the dip application method and solidified.

The dry thickness (also referred to as the "dry layer thickness") of the charge generating layer was 0.3 μm.

<Formation of Charge Transporting Layer>

The following components were mixed, and a charge transporting layer composition was obtained.

(Composition)

Charge transporting substance: CTM (Compound X shown below) 150 parts by mass

Binder resin: Polycarbonate (Z-300, manufactured by Mitsubishi Gas Chemical Company, Inc.) 300 parts by mass Antioxidant: Irganox 1010 (manufactured by BASF Japan Ltd.) 6 parts by mass Tetrahydrofuran 1600 parts by mass Toluene 400 parts by mass Silicone oil: KF-54 (manufactured by Shin-Etsu Chemical Co., Ltd) 1 part by mass The charge transporting layer composition was applied to the above charge generating layer by the dip application method and solidified.

The dry layer thickness of the charge transporting layer was 25 μm.

Compound X

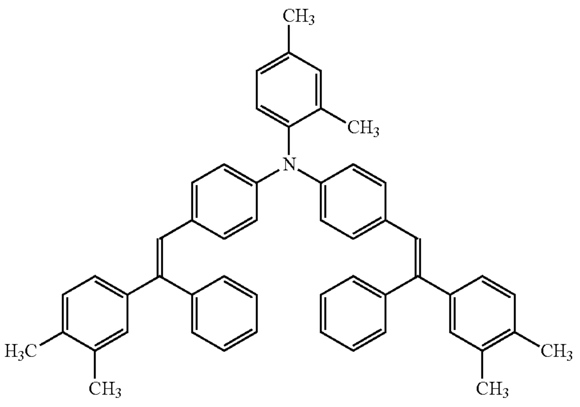

<Formation of Surface Protecting Layer>

The following components were mixed, and a surface protecting layer composition was obtained.

(Composition)

Silicon oxide (silicon oxide whose surface has been modified with methylhydrogenpolysiloxane of the same mass (surface treatment) and having a number-average primary particle diameter of 30 nm) 30 parts by mass Hole transporting compound: Compound A1 shown below 150 parts by mass (50% by mass)

Polyfunctional polymerizable compound having no hole transporting property: Trimethylolpropane trimethacrylate 105 parts by mass Solvent: Isopropyl alcohol 450 parts by mass Tetrahydrofuran 150 parts by mass The above components were dispersed for 10 hours using a sand mill, and 15 parts by mass of a polymerization initiator [1](Bis(2,4,6-trimethylbenzoyl)-phenylphosphine oxide: "Irgacure 819" (manufactured by BASF Japan Ltd.) was added thereto. The mixture was mixed and stirred under a light-shielded condition to dissolve the initiator, and a surface protecting layer coating solution was prepared. The surface protecting layer coating liquid was light-shielded during storage. The coating liquid was applied using a circular slide hopper application device to the photoreceptor, which had been prepared up to the charge transporting layer, and a surface protecting layer was formed. After application and drying at room temperature for 20 minutes (solvent drying process), the photoreceptor was irradiated with light with an integrated energy of 1.9 [J/cm$^2$] using a metal halide lamp (5 W) from a distance of 100 mm while rotating (UV curing process), and the surface protecting layer having a layer thickness of 3 μm was obtained.

In the composition of the above coating solution, the mass percent of hole transporting compound when the total solid content is set to 100 mass percent is also indicated.

In each of the examples, a hole transporting compound selected from the compounds represented by A1 to A4 below was used. Compounds A1 to A3 are compounds synthesized by the synthetic route of compounds having the structure represented by General formulas A1 to A3 above. Compound A4 is a hole transporting compound for Comparative Examples.

A1

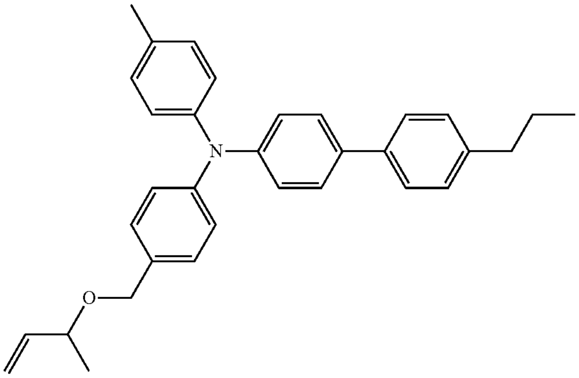

A2

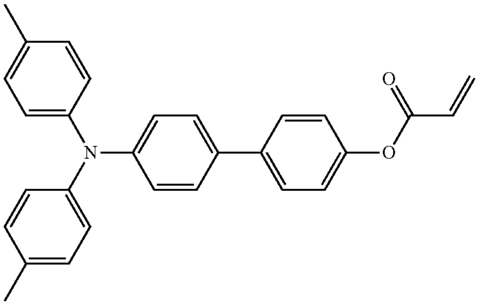

-continued

A3

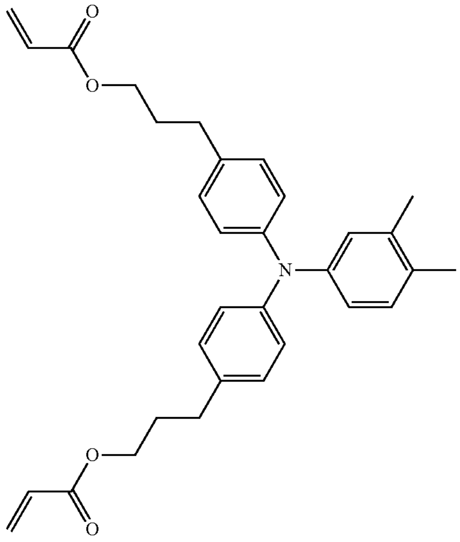

A4

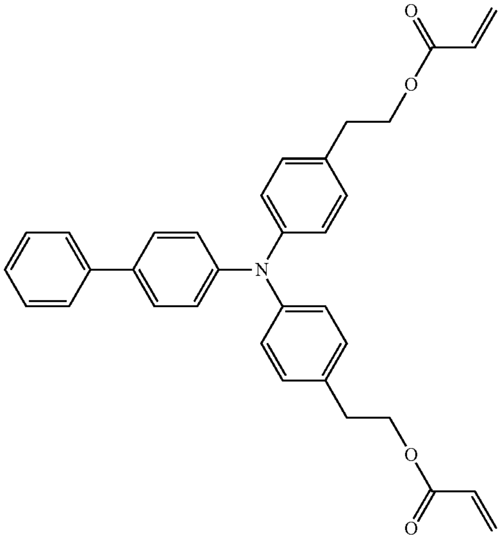

[Production of Photoreceptor 2 to Photoreceptor 5]

Photoreceptors 2 to 5 were produced in the same manner as Photoreceptor 1, except that the amount of the hole transporting compound A1 introduced into the surface protecting layer was changed to 25, 30, 70, and 75 parts by mass.

[Production of Photoreceptor 6 to Photoreceptor 8]

Photoreceptors 6 to 8 were produced in the same manner as Photoreceptor 1, except that the hole transporting compound A1 introduced into the surface protecting layer was changed to hole transporting compounds A2 to A4, and the amount of the hole transporting compound was changed as described in TABLES.

[Production of Cleaning Blade a]

<Production of Rubber Sheet>

An urethane rubber sheet of 2 mm in thickness was produced front 4,4'-diphenylmethane diisocyanate, polyester polyol, and short-chain polyol as raw materials, using a known centrifugal molding method.

A rubber sheet of rubber material with the hardness of 72° and the rebound resilience of 11° was produced while the blending ratio was changed.

The above rubber hardness is the hardness value specified in JIS-A.

<Formation of Edge Portion>

The edge portion having an edge angle θ, of 100° was formed by cutting the rubber sheet A with the blade at an angle inclined by 10° with respect to the vertical direction.

<Cutting and Bonding of Cleaning Blade>

The rubber sheet A was further cut into 340 mm×14.5 mm by a blade further inserted in the vertical direction. The cut rubber sheet A was bonded to a plate metal by heating using a thermosetting adhesive with a overlap width of 4 mm. As a result, Cleaning Blade a having a free length of 10.0 mm and a ratio of free length L to thickness d (L/d) of 5.0 was produced.

[Production of Cleaning Blades b to f, k, and l]

Cleaning Blades b to f, k, and I described in TABLE II and TABLE III were produced in the same manner as Cleaning Blade a, except that the edge angles θ, were changed to 93°, 96°, 110°, 115°, 120°, 90°, and 125°.

[Production of Cleaning Blades g, h, and i]

Cleaning Blades g, h, and I were produced in the same manner as Cleaning Blade a, except that the thickness of the rubber sheet and the free length were changed as described in TABLE I.

TABLE I

| | Size of blade | | |
|---|---|---|---|
| Blade No. | Free length L | Thickness d | Raise L/d |
| a-f, j, K | 10 mm | 2 mm | 5.0 |
| g | 8.5 mm | 2.4 mm | 3.5 |
| h | 7.5 mm | 2.5 mm | 3.0 |
| i | 5 mm | 3 mm | 1.7 |

[Production of Toner]

<Synthesis of Hybrid Crystalline Polyester Resin (c1)>

Monomers as raw materials for the following addition polymerization resin (styrene acrylic resin: StAc) units, including both reactive monomers and radical polymerization initiator were put into a dropping lot.

| Styrene 34 parts by mass | |
|---|---|
| n-butyl acrylate | 12 parts by mass |
| Acrylic acid | 2 parts by mass |
| Polymerization initiator: di-t-butyl peroxide | 7 parts by mass |

Monomers as raw materials for the following polycondensation resin (crystalline polyester resins: CPEs) units were put into a four-neck flask equipped with a nitrogen inlet tube, dehydration tube, stirrer, and thermocouple, and heated to 170° C. to be dissolved.

| | |
|---|---|
| Sebacic acid | 369 parts by mass |
| 1,10-decanediol | 318 parts by mass |

Next, the monomers as raw materials for the addition polymerization resin (StAc) were added dropwise over 90 minutes under stirring, and after aging for 60 minutes, the unreacted addition polymerization monomers were removed under reduced pressure (8 kPa).

The amount of removed monomer was very small compared to the monomer as raw materials for the resins mentioned above.

Then, 0.8 parts by mass of $Ti(OBu)_4$ was added as an esterification catalyst. The temperature was raised to 235° C., and the reaction was carried out under normal pressure (101.3 kPa) for 5 hours and then under reduced pressure (8 kPa) for 1 hour.

Next, after cooling to 200° C., the reaction was carried out under reduced pressure (20 kPa) for 1 hour, and the hybrid crystalline polyester resin (c1) was obtained.

The hybrid crystalline polyester resin (c1) contained 8% by mass of resin (StAc) units other than CPEs (crystalline polyester resin) with respect to the total amount of the hybrid crystalline polyester resin, and had a structure of the crystalline polyester resin grafted onto StAc.

The number average molecular weight (Mn) and melting point (Tc) of the hybrid crystalline polyester resin (c1) were 9000 and 76° C., respectively.

<Preparation of Aqueous Dispersion Liquid (C1) of Hybrid Crystalline Polyester Resin Particle>

30 parts by mass of the above crystalline polyester resin that had been melted were transferred as it is to an emulsifying and dispersing machine "Cavitron (registered trademark) CD1010" (manufactured by Cavitron GmbH) at a transfer rate of 100 parts by mass per minute.

At the same time as transferring the melted crystalline polyester resin, dilute ammonia water was transferred to the emulsifying and dispersing machine "Cavitron (registered trademark) CD1010" (manufactured by Cavitron GmbH) at a rate of 0.1 liter per minute while heated to 100° C. using a heat exchanger. The dilute ammonia water had a concentration of 0.37% by mass and was prepared in an aqueous solvent tank by dilution of 70 mass of reagent ammonia water with ion exchange water.

Then, the emulsifying and dispersing machine "Cavitron (registered trademark) CD1010" (manufactured by Cavitron GmbH) was operated at a rotation speed of a rotor of 60 Hz and a pressure of 5 $kg/cm^2$ to prepare a fine particle dispersion liquid of crystalline polyester resin with a solid content of 30 parts by mass.

The particles in the above crystalline polyester resin fine particle dispersion liquid had a volume-based median diameter of 200 nm.

<Preparation of Aqueous Dispersion Liquid of Amorphous Resin Particles (Xl)>

(First Polymerization)

8 mass parts of sodium dodecyl sulfate and 3000 parts by mass of ion-exchanged water were fed in a 5L reaction vessel equipped with a stirrer, a temperature sensor, a cooling tube, and a nitrogen induction device and were stirred under nitrogen flow at a stirring rate of 230 rpm while the internal temperature of the reaction vessel was raised to 80° C. After the temperature was raised, 10 parts by mass of potassium persulfate dissolved in 200 parts by mass of ion-exchanged water were added, and the liquid temperature was raised again to 80° C. The mixture of the following monomers was added dropwise over a period of 1 hour.

| | |
|---|---|
| Styrene | 480 parts by mass |
| n-butyl acrylate | 250 parts by mass |
| Methacrylic acid | 68.0 parts by mass |

The monomers were then heated and stirred at 80° C. for 2 hours to be polymerized, and a dispersion liquid (x1) of resin fine particles was prepared.

(Second Polymerization)

A solution of 7 parts by mass of sodium polyoxyethylene (2) dodecyl ether sulfate dissolved in 3000 parts by mass of ion-exchanged water was fed in a 5L reaction vessel equipped with a stirrer, a temperature sensor, a cooling tube, and a nitrogen induction device and heated to 98° C. After that, a solution including 260 mass parts of the dispersion liquid (xl) of the resin fine particles, the following monomers, and the releasing agent dissolved at 90° C. was added to the vessel, and mixed and dispersed for 1 hour by a mechanical dispersing machine "CLEARMIX" (manufactured by M Technique Co., Ltd.) equipped with a circulation path. A dispersion liquid containing emulsified particles (oil droplets) was thereby prepared.

| | |
|---|---|
| Styrene (St) | 284 parts by mass |
| n-butyl acrylate (BA) | 92 parts by mass |
| Methacrylic acid (MAA) | 13 parts by mass |
| n-octyl-3-mercaptopropionate | 1.5 parts by mass |
| Releasing agent: Behenic acid behenate (melting point 73° C.) | 190 parts by mass |

Next, an initiator solution in which 6 parts by mass of potassium persulfate dissolved in 200 parts by mass of ion-exchanged water was added to the dispersion. The system was then heated and stirred at 84° C. for 1 hour so that the monomers were polymerized, and a dispersion liquid (x2) of the resin fine particles were prepared.

(Third Polymerization)

Then, 400 parts by mass of ion-exchanged water was added to the dispersion liquid (x2) of the resin fine particles, and mixed well. Then, a solution of 11 parts by mass of potassium persulfate dissolved in 400 parts by mass of ion-exchanged water was added, and the mixture of the following monomers was added dropwise for 1 hour at a temperature of 82° C.

| | |
|---|---|
| Styrene (St) | 350 parts by mass |
| n-Butyl acrylate (BA) | 215 parts by mass |
| Acrylic acid (AA) | 30 parts by mass |
| n-octyl-3-mercaptopropionate | 8 parts by mass |

After completion of the drop of the mixed solution, the solution was heated and stirred for 2 hours for polymerization, and then cooled to 28° C., and an aqueous dispersion liquid (Xl) was prepared.

In the aqueous dispersion liquid (X1) of the obtained amorphous resin fine particles, the amorphous resin fine particles had a volume-based median diameter of 220 nm, a glass transition temperature (Tg) of 55° C., and a weight average molecular weight (Mw) of 32000.

<Preparation of Aqueous Dispersion Liquid of Colorant Particles (Cyl)>

90 parts by mass of sodium dodecyl sulfate was added to 1600 parts by mass of ion-exchanged water.

While stirring this solution, 420 mass parts of copper phthalocyanine (C.I. Pigment Blue 15:3) was gradually added. The solution was then dispersed using the "CLEARMIX" agitator (manufactured by M Technique Co., Ltd.), and the aqueous dispersion liquid (Cyl) of the colorant particles was prepared.

In the obtained aqueous dispersion liquid (Cyl) of the colorant particles, the volume-based median diameter of the colorant particles was 110 nm.

<Production of Cyan Toner 1>

288 parts by mass (solid content equivalent) of aqueous dispersion liquid (Xl) of the amorphous resin fine particles, 70 parts by mass (solid content equivalent) of aqueous dispersion liquid (Cl) of the hybrid crystalline polyester resin fine particles, and 2000 parts by mass of ion-exchanged water were fed in a reaction vessel equipped with a stirrer, a temperature sensor, and a cooling tube. After that, sodium hydroxide solution of 5 mol/liter was added in order that the pH was adjusted to 10.

Then, 30 parts by mass (solid content equivalent) of aqueous dispersion liquid (Cyl) of the colorant particles was added. Next, a solution of 60 parts by mass of magnesium chloride dissolved in 60 parts by mass of ion-exchanged water was added over a period of 10 minutes at 30° C. during stirring.

Then, after being left for 3 minutes, the system was started to be heated up to 80° C. over a period of 60 minutes, and the temperature of this system was maintained at 80° C. so that the particle growth reaction continued.

During this process, the particle diameter of the aggregated particles was measured with a "Coulter Multisizer 3" (manufactured by Beckman Coulter Inc.), and when the volume-based median diameter reached 6.0 μm, sodium chloride 190 parts by mass dissolved in 760 parts by mass of ion-exchanged water was added to stop the particle growth reaction.

After being heated to 90° C., the particles were further fused together while being heated to keep the temperature at 90° C. and stirred. When the average circularity of the toner reached 0.945, the temperature was reduced to 30° C. at a cooling rate of 2.5° C./min. The average circularity was measured using the FPIA-2100 (manufactured by Sysmex Corporation) (HPF (high power field) detection number: 4000).

Next, after a washing process in which the toner cake obtained by solid-liquid separation and dehydration was re-dispersed in ion-exchanged water three times, solid-liquid separation, and drying process at 40° C. for 24 hours, Toner Matrix Particles 1 were obtained.

To 100 parts by mass of the obtained Toner Matrix Particles 1, 0.6 parts by mass of hydrophobic silica (number average primary particle diameter=12 nm, hydrophobicity=68), 1.0 parts by mass of hydrophobic titanium dioxide (number average primary particle diameter=2.0 nm, hydrophobicity=63), and 0.30 parts by mass of zinc stearate as a fatty acid metal salt were added. After mixing for 20 minutes at 32° C. with a Henschel mixer (manufactured by NIPPON COKE & ENGINEERING Co., LTD.) at a peripheral speed of 35 mm/sec, coarse particles were removed using a sieve with a 45 μm mesh opening (external additive treatment). As a result. Cyan Toner 1 was obtained with a volume average particle diameter of 6.1 μn.

<Production of Cyan Toners 2 and 3>

Cyan Toners 2 and 3 were obtained in the same manner as in the production of Cyan Toner 1, except that the amount of zinc stearate as a fatty acid metal salt was changed to 0.10 and 0.15 parts by mass.

[Production of Developing Agent]

To Cyan Toners 1 to 3, a ferrite carrier having a volume average particle diameter of 60 μm coated with acrylic resin was added and mixed so that a developing agent with a toner concentration of 6.5% by mass was produced.

[Production of Electrophotographic Image Forming System I]

The drum unit of the bizhub C650 i machine (manufactured by Konica Minolta, Inc.) was disassembled and the photoreceptor and cleaning blade therein were replaced with the Photoreceptor 1 and Cleaning Blade a above, respectively. The effective contact angle $\theta_1$ of the cleaning blade under the condition of contacting load 12 N/m was adjusted as listed in TABLE I. They were mounted in the cyan color position of the machine, and Electrophotographic Image Forming System 1 was produced using Cyan Toner 1, the developing agent produced as described above.

[Production of Electrophotographic Image Forming Systems 2 to 27]

The drum unit of the bizhub C650 i machine (manufactured by Konica Minolta. Inc.) was disassembled and the photoreceptor and cleaning blade therein were replaced with each of Photoreceptors 1 to 8 and each of the Cleaning Blades a to k above. The effective contact angle $\theta_1$ of each of the cleaning blades under the condition of contacting load 12 N/m was adjusted as listed in Tables II and III. They were mounted in the cyan color position of the machine, and Electrophotographic Image Forming Systems 2 to 27 were produced using each of Cyan Toners 1 to 3, the developing agents produced as described above.

<<Evaluation Method>>

(1) Evaluation of Thread-like Adhesion

Using the above Systems 1 to 27, an image chart having a magenta band solid patch of a width of 15 mm in the transport direction and a length perpendicular to the transport direction of 290 mm was printed on one side of each of 100,000 sheets of A4 size paper. Here, the setting was changed so that the voltage applied to the charging means was higher than the specification value of the machine by 200 V. The evaluation was then conducted under a condition in which adhesion of external additive was easily generated due to the discharge load. The evaluation was conducted in a low-temperature and low-humidity environment (specifically, 10° C. and 20% RH), which was a harsh condition because the external additive was likely to slip off due to a high charge and the like.

After printing, the sheets were checked throughout the entire longitudinal direction whether or not there were thread-like adhesions on the photoreceptor. Two points were given when the cyan-colored threads were individually and clearly visually observed. One point was given when transparent threads could be observed with light. The lower the total points, the better the System is with respect to the thread-like adhesion. Systems that scored 30 points or less were classified as acceptable (AA), and Systems that scored 31 points or more were classified as unacceptable (BB).

Apparatus that were unacceptable (BB) in the evaluation of blade noise and flipping described below were not evaluated for the thread-like adhesion.

(2) Evaluation of Blade Noise and Flipping

In the above Systems 1 to 26, the cleaning blade was adjusted so that the contacting load was 27 N/m.

In a high temperature and humidity environment of 30° C. and 80% RH, where the tip of the cleaning blade is easily pulled in, the bizhub C650 i machine was used to print 1000 sheets of blank paper. During the printing process, the presence or absence of noise (loud noise caused by blade vibration) and flipping was checked. Systems where noise or flipping did not occur were classified as acceptable (AA), and those where noise or flipping did occur were classified as unacceptable (BB).

(3) Evaluation of Photoreceptor Abrasion

In the evaluation of thread-like adhesion, the thickness of the surface protecting layer on the photoreceptor before and after printing was measured at 5 mm intervals in the longitudinal direction using an optical layer thickness meter, such that the average abrasion amount was calculated after printing 100,000 sheets. The system with an average abrasion amount of 0.10 μm or less was classified as acceptable (AA), and the system with an average abrasion amount more than 0.10 μm was classified as unacceptable (BB).

(4) Evaluation of Pattern Memory

Using above Systems 1 to 27, in a low-temperature and low-humidity environment of 10° C. and 20% RH, vertical strip solid images were continuously printed on 20 transfer sheets (Pod Gloss Coat, Paper A4 size, 100 $g/m^2$, manufactured by Oji Paper Co., Ltd.), followed by full-surface solid images on 3 transfer sheets. Whether or not a history of the strip solid image, in other words, a pattern memory, had occurred in the obtained full-surface solid image was evaluated according to the following evaluation criteria.

A reflectance density of an area that corresponded to the strip solid image and the reflectance density of the area that did not correspond to the strip solid image in the obtained full-surface solid image were measured using a Reflective Densitometer (RD918, manufactured by Gretag Macbeth LL. The difference in reflectance density between the two measured values (ΔID) was then calculated.

The systems with the ΔID of less than 0.010 were classified as acceptable (AA) for pattern memory, and the systems with the ΔID of 0.010 or more were classified as unacceptable (BB) for pattern memory.

The above mentioned configurations of the photoreceptor, the cleaning blade, and the developer, as well as the evaluation results, are shown in TABLES 11 and III.

TABLE II

| System No. | Photoreceptor No. | Photoreceptor surface protecting layer Hole transporting compound Structure | Content (parts by mass) | Blade No. | Cleaning blade $\theta_0$ (°) | $\theta_1$ (°) | L/d |
|---|---|---|---|---|---|---|---|
| 1 | 1 | A1 | 50 | a | 100 | 13 | 5.0 |
| 2 | 2 | A1 | 25 | a | 100 | 13 | 5.0 |
| 3 | 3 | A1 | 30 | a | 100 | 13 | 5.0 |
| 4 | 4 | A1 | 70 | a | 100 | 13 | 5.0 |
| 5 | 5 | A1 | 75 | a | 100 | 13 | 5.0 |
| 6 | 1 | A1 | 50 | a | 100 | 13 | 5.0 |
| 7 | 1 | A1 | 50 | a | 100 | 13 | 5.0 |
| 8 | 1 | A1 | 50 | b | 93 | 13 | 5.0 |
| 9 | 1 | A1 | 50 | c | 96 | 13 | 5.0 |
| 10 | 1 | A1 | 50 | d | 110 | 13 | 5.0 |
| 11 | 1 | A1 | 50 | e | 115 | 13 | 5.0 |
| 12 | 1 | A1 | 50 | a | 100 | 8 | 5.0 |
| 13 | 1 | A1 | 50 | a | 100 | 9 | 5.0 |
| 14 | 1 | A1 | 50 | a | 100 | 17 | 5.0 |

TABLE II-continued

| | | | | | | | |
|---|---|---|---|---|---|---|---|
| 15 | 1 | A1 | 50 | a | 100 | 20 | 5.0 |
| 16 | 1 | A1 | 50 | f | 120 | 13 | 5.0 |
| 17 | 1 | A1 | 50 | g | 100 | 20 | 3.5 |
| 18 | 1 | A1 | 50 | h | 100 | 20 | 3.0 |
| 19 | 6 | A2 | 50 | a | 100 | 13 | 5.0 |
| 20 | 7 | A3 | 70 | a | 100 | 13 | 5.0 |

| System No. | Photoreceptor No. | Developing agent Fatty acid metal salt Content (parts by mass) | Evaluation Thread-like adhesion Result | Number | Flipping test | Surface layer abrasion | Pattern memory | Remarks |
|---|---|---|---|---|---|---|---|---|
| 1 | 1 | 0.3 | AA | 3 | AA | AA | AA | Inv. 1 |
| 2 | 2 | 0.3 | AA | 11 | AA | AA | AA | Inv. 2 |
| 3 | 3 | 0.3 | AA | 4 | AA | AA | AA | Inv. 3 |
| 4 | 4 | 0.3 | AA | 4 | AA | AA | AA | Inv. 4 |
| 5 | 5 | 0.3 | AA | 12 | AA | AA | AA | Inv. 5 |
| 6 | 1 | 0.1 | AA | 14 | AA | AA | AA | Inv. 6 |
| 7 | 1 | 0.15 | AA | 6 | AA | AA | AA | Inv. 7 |
| 8 | 1 | 0.3 | AA | 17 | AA | AA | AA | Inv. 8 |
| 9 | 1 | 0.3 | AA | 7 | AA | AA | AA | Inv. 9 |
| 10 | 1 | 0.3 | AA | 7 | AA | AA | AA | Inv. 10 |
| 11 | 1 | 0.3 | AA | 15 | AA | AA | AA | Inv. 11 |
| 12 | 1 | 0.3 | AA | 20 | AA | AA | AA | Inv. 12 |
| 13 | 1 | 0.3 | AA | 9 | AA | AA | AA | Inv. 13 |
| 14 | 1 | 0.3 | AA | 9 | AA | AA | AA | Inv. 14 |
| 15 | 1 | 0.3 | AA | 19 | AA | AA | AA | Inv. 15 |
| 16 | 1 | 0.3 | AA | 22 | AA | AA | AA | Inv. 16 |
| 17 | 1 | 0.3 | AA | 25 | AA | AA | AA | Inv. 17 |
| 18 | 1 | 0.3 | AA | 28 | AA | AA | AA | Inv. 18 |
| 19 | 6 | 0.3 | AA | 24 | AA | AA | AA | Inv. 19 |
| 20 | 7 | 0.3 | AA | 29 | AA | AA | AA | Inv. 20 |

TABLE III

| System No. | Photoreceptor No. | Photoreceptor surface protecting layer Hole transporting compound Structure | Content (parts by mass) | Blade No. | Cleaning blade $\theta_0$ (°) | $\theta_1$ (°) | L/d |
|---|---|---|---|---|---|---|---|
| 21 | 8 | A4 | 40 | a | 100 | 13 | 5.0 |
| 22 | 8 | A4 | 40 | i | 100 | 30 | 1.7 |
| 23 | 1 | A1 | 50 | i | 100 | 30 | 1.7 |
| 24 | 1 | A1 | 50 | a | 100 | 7 | 5.0 |
| 25 | 1 | A1 | 50 | a | 100 | 22 | 5.0 |
| 26 | 1 | A1 | 50 | j | 90 | 13 | 5.0 |
| 27 | 1 | Al | 50 | K | 125 | 13 | 5.0 |

| System No. | Photoreceptor No. | Developing agent Fatty acid metal salt Content parts by mass) | Evaluation Thread-like adhesion Result | Number | Flipping test | Surface layer abrasion | Pattern memory | Remarks |
|---|---|---|---|---|---|---|---|---|
| 21 | 8 | 0.3 | BB | 38 | AA | AA | AA | Comp. 1 |
| 22 | 8 | 0.3 | BB | 41 | AA | AA | AA | Comp. 2 |
| 23 | 1 | 0.3 | BB | 40 | AA | AA | AA | Comp. 3 |
| 24 | 1 | 0.3 | BB | 31 | AA | AA | AA | Comp. 4 |
| 25 | 1 | 0.3 | — | — | BB | — | AA | Comp. 5 |
| 26 | 1 | 0.3 | — | — | BB | — | AA | Comp. 6 |
| 27 | 1 | 0.3 | BB | 32 | AA | AA | AA | Comp. 7 |

According to the evaluation results in TABLE II and TABLE III, the Systems of Inv. 1 to 20 system, with the photoreceptor protecting layer and the cleaning blade with an edge angle θ, and an effective contact angle $\theta_1$ according to the present invention, were acceptable (AA) in all of the thread-like adhesion, the flipping test, the abrasion amount (durability) of the surface protecting layer, and pattern memory. It was found that, in the Systems of Inv. 1 to 20, compared to the Systems of Comp. 1 to 7, the occurrence of thread-like adhesion due to aggregates derived from an external additive was suppressed, the wear resistance and charge transporting property of the photoreceptor were secured, and the excellent durability of the photoreceptor and good image quality were compatible. Furthermore, it was found that the thread-like adhesion was significantly improved when the edge angle θ, of the cleaning blade was in the range of 95 to 110°, the effective contact angle $\theta_c$ was in the range of 9 to 17°, and the ratio of the free length L to the thickness d (L/d) was 3.5 or more.

Although configurations and operations of the electrophotographic image forming system have been described and illustrated in detail, the disclosed embodiments are made for purposes of illustration and example only and not limitation. The scope of the present invention should be interpreted by terms of the appended claims.

The entire disclosure of Japanese Patent Application No. 2021-202148 filed on Dec. 14, 2021 is incorporated herein by reference in its entirety.

The invention claimed is:

1. An electrophotographic image forming system that forms an electrostatic latent image on at least a photoreceptor, develops an image using an electrostatic charge image developing toner, and removes the electrostatic charge image developing toner using a cleaning blade, a tip ridge of the cleaning blade being pressed against a surface of the photoreceptor, the electrophotographic image forming system comprising:

a photoreceptor including a photosensitive layer, a surface protecting layer that is provided on a surface of the photosensitive layer, wherein the surface protecting layer includes a polymerizable monomer having at least two polymerizable groups in a molecule and a polymer of a hole transporting compound having a polymerizable group represented by General formula (1) below, and the tip ridge of the cleaning blade has an edge angle that is obtuse and less than 120° and is pressed against the surface of the photoreceptor at an effective contact angle that is in a range of 8° to 20°

General formula (1)

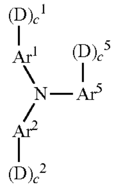

in General formula (1), $Ar^1$ and $Ar^2$ each represent a linking group represented by a structural formula (7) below; $Ar^5$ represents a group represented by a structural formula (8) or a structural formula (9) below; the total number of D that is a sum of $c^1$, $c^2$, and $c^5$ is 1 or 2 when $Ar^5$ is represented by the structural formula (8); the total number of D is 1 when $Ar^5$ is represented by the structural formula (9); D is represented by $-(-(CH_2)_d-(O-(CH_2)_f-)_e-O-CO-C(CH_3)=CH_2)$ or $-(-(CH_2)_d-(O-(CH_2)_f-)_e-O-CO-CH=CH_2)$; d and f each independently represent an integer of 0 to 5; e represents 0 or 1; and $c^1$, $c^2$, and $c^5$ each independently represent 0, 1, or 2, (7)

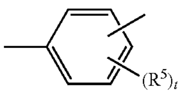

(8)

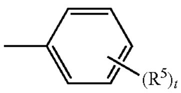

(9)

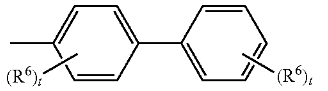

in the structural formulas (7), (8), and (9), $R^5$ and $R^6$ each independently represent one selected from a group consisting of a hydrogen atom, an alkyl group containing 1 to 4 carbon atoms, a phenyl group substituted with an alkoxy group having 1 to 4 carbon atoms, an unsubstituted phenyl group, an aralkyl group having 7 to 10 carbon atoms, and a halogen atom; t represents an integer of 1 to 3; and two of $R^6$ may be optionally bonded together so that the structural formula (9) forms a cyclic structure.

2. The electrophotographic image forming system according to claim 1, wherein a ratio of a free length of the cleaning blade to a thickness of the cleaning blade is 3.5 or more.

3. The electrophotographic image forming system according to claim 1, wherein $Ar^5$ in General formula (1) represents a linking group represented by the structural formula (9), and wherein the total number of D is 1.

4. The electrophotographic image forming system according to claim 3, wherein at least one of d and e in D in the hole transporting compound is 1 or more.

5. The electrophotographic image forming system according to claim 1, wherein the effective contact angle is in a range of 9° to 17°.

6. The electrophotographic image forming system according to claim 1, wherein the edge angle is in a range of 95° to 110°.

7. The electrophotographic image forming system according to claim 1, wherein the photoreceptor further includes a fatty acid metal salt, and wherein an amount of the fatty acid metal salt in the photoreceptor is 0.15% by mass or more with respect to toner matrix particles.

8. The electrophotographic image forming system according to claim 1, wherein the hole transporting compound is contained in a range of 30% to 70% by mass with respect to the surface protecting layer.

* * * * *